US008988692B2

(12) United States Patent
Myoki

(10) Patent No.: US 8,988,692 B2

(45) Date of Patent: Mar. 24, 2015

(54) INFORMATION PROCESSING APPARATUS, INFORMATION PROCESSING METHOD, AND STORAGE MEDIUM

(75) Inventor: Yutaka Myoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 13/479,370

(22) Filed: May 24, 2012

(65) Prior Publication Data

US 2012/0307295 A1 Dec. 6, 2012

(30) Foreign Application Priority Data

Jun. 1, 2011 (JP) ................................ 2011-123138

(51) Int. Cl.
*G06F 3/12* (2006.01)

(52) U.S. Cl.
CPC ............ *G06F 3/1206* (2013.01); *G06F 3/1232* (2013.01); *G06F 3/1247* (2013.01); *G06F 3/1285* (2013.01); *G06F 3/1248* (2013.01)
USPC ........................................ 358/1.13; 358/1.15

(58) Field of Classification Search
CPC ... G06F 3/1206; G06F 3/1232; G06F 3/1247; G06F 3/1248; G06F 3/1285
USPC ................................. 358/1.1–1.9, 1.11–1.18
IPC ....................................................... G06K 15/02
See application file for complete search history.

(56) References Cited

U.S. PATENT DOCUMENTS

2006/0174193 A1 8/2006 Kikuchi
2008/0239398 A1* 10/2008 Nakagiri et al. ............. 358/1.18
2009/0168100 A1* 7/2009 Huster ......................... 358/1.15
2010/0195140 A1* 8/2010 Shepherd et al. ............ 358/1.15

FOREIGN PATENT DOCUMENTS

JP H11-250041 A 9/1999

* cited by examiner

*Primary Examiner* — King Poon
*Assistant Examiner* — Ibrahim Siddo
(74) *Attorney, Agent, or Firm* — Carter, DeLuca, Farrell & Schmidt, LLP

(57) ABSTRACT

A print control program has a target printer designating step of designating a target printer for printing, a target printer determining step of determining capabilities of the target printer, and a language converting step of converting the page description language into another page description language depending on capabilities of the target printer. A rule creation unit creates a repetition rule corresponding to a repetition element and a rule application unit creates a repetition structure for configuration information using the repetition rule.

12 Claims, 26 Drawing Sheets

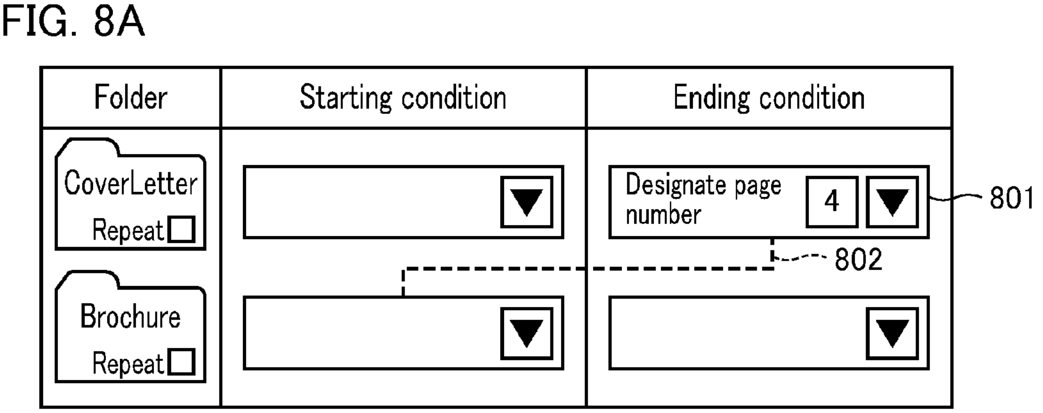

FIG. 8A

| Folder | Starting condition | Ending condition |
|---|---|---|
| CoverLetter Repeat☐ | ▼ | Designate page number [4] ▼ — 801 |
| Brochure Repeat☐ | ▼ | ▼ |

---- 802

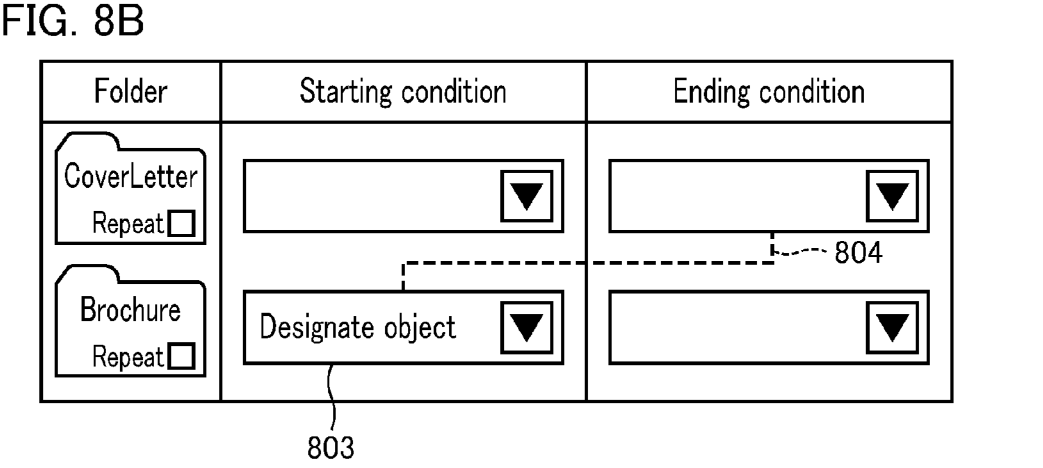

FIG. 8B

| Folder | Starting condition | Ending condition |
|---|---|---|
| CoverLetter Repeat☐ | ▼ | ▼ |
| Brochure Repeat☐ | Designate object ▼ | ▼ |

---- 804
803

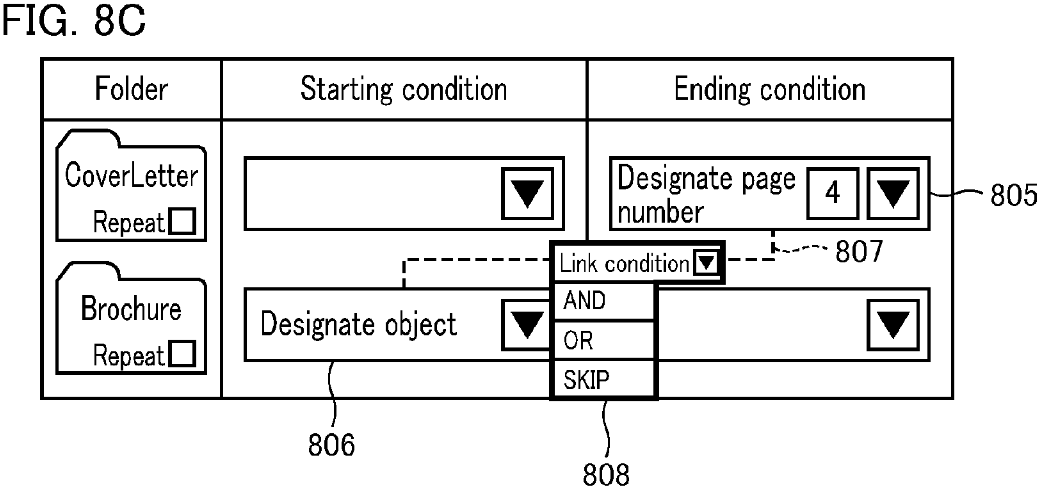

FIG. 8C

| Folder | Starting condition | Ending condition |
|---|---|---|
| CoverLetter Repeat☐ | ▼ | Designate page number [4] ▼ — 805 |
| Brochure Repeat☐ | Designate object ▼ | ▼ |

Link condition ▼ ---- 807
AND
OR
SKIP 806
808

FIG. 14

```
<PDFVT>
 <DPM>
  <RecordLevel>1</RecordLevel>
 </DPM>
 <Customer>
  <DPM>
   <Name>Jone Doe</Name>
   <Gender>Male</Gender>
  </DPM>
  <Letter>
   <CoverLetter>
    <PDFPage/>   < ! --PDF page allocation-->
   </CoverLetter>
   <Brochure>
    <PDFPage/>   < ! --PDF page allocation-->
    <PDFPage/>   < ! --PDF page allocation-->
    <PDFPage/>   < ! --PDF page allocation-->
   </Brochure>
  </Letter>
 </Customer>
```

```
<Customer>
 <DPM>
  <Name>Jane Doe</Name>
  <Gender>Female</Gender>
 </DPM>
 <Letter>
  <CoverLetter>
   <PDFPage/>   < ! --PDF page allocation-->
  </CoverLetter>
  <Brochure>
   <PDFPage/>   < ! --PDF page allocation-->
   <PDFPage/>   < ! --PDF page allocation-->
   <PDFPage/>   < ! --PDF page allocation-->
  </Brochure>
 </Letter>
</Customer>
</PDFVT>
```

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus for providing a print workflow which creates, stores, edits, said prints a file for printing, an information processing method, and a storage medium. In particular, the present invention relates to an information processing apparatus using a file format for printing including PDF, PDF/X, or the like, an information processing method, and a storage medium.

2. Description of the Related Art

In recent years, in the print workflow for creating/storing/editing/printing files for printing, PDF (Portable Document Format) has been used more frequently as the format of files for printing. PDF is used, in various platforms including Microsoft Windows (registered trademark), Mac OS (registered trademark), or the like. Also, in PDF, all data such as font data, image data, or the like can be stored, in one file.

Thus, PDF is excellent in portability for data exchange among a plurality of personnel involved, in a print workflow and is also readily corrected by a plurality of personnel. PDF can also store other elements used for a purpose other than printing. With regard to this, International Organization for Standard (hereinafter abbreviated as "ISO") developed PDF/X (ISO 15930 Graphic technology—Prepress digital data exchange using PDF—). PDF/X is a subset of PDF for the purpose of print data exchange. PDF/X is also widely used in a print workflow.

On the other hand, Print On Demand (hereinafter abbreviated as "POD") market has been expanding along with an increase in print speed, and image quality of electrophotographic and inkjet printing devices. POD is intended to handle relatively small-lot print jobs in a short turnaround, time by performing digital printing using electronic data through the maximum use of a digital image forming apparatus such as a digital copier, a digital multi-function peripheral, or the like.

In POD, a printing method known as variable data printing (hereinafter abbreviated as "VDP") is performed, which takes advantage of the characteristic that electronic data is used. In VDP, a document consists of a fixed portion and a variable portion. Data acquired from the data source such as customer DB or the like is processed to thereby create data, of the variable portion. In this manner, contents that differ for each customer can be printed.

Although contents that differ for each customer can be printed in VDP, the consent of the fixed portion of the document is common among the customers. Thus, the fixed portion needs to be processed efficiently during printing. There are also emerging stronger requirements for performing print control such as paper sheet selection, print page selection, or the like depending on the customer characteristics such as gender, purchase history, or the like. When performing such print control, print setting is widely being described using a job ticket format called JDF (Job Definition Format). In order to satisfy these requirements, ISO developed PDF/VT (ISO 16612-2 Graphic technology—Variable data exchange—Part 2: Using PDF/X-4 and PDF/X-5 (PDF/VT-1 and PDF/VT-2)) as a file format for VDP based on PDF/X. In PDF/VT, the specification for efficiently performing processing for a fixed portion and the specification of the hierarchical structure or metadata for facilitating print setting by means of JDF are added.

Conventionally, data in PDF file format or PDF/X file (hereinafter collectively referred, to as "PDF file") format has been accumulated in companies. A print workflow for holding a printer capable of printing data in PDF format or PDF/X format (hereinafter referred to as "PDF-compatible printer") is also present.

In the conventional print workflow, when a printer capable of printing data in both PDF format and PDF/VT format (hereinafter referred to as "PDF/VT-compatible printer") is newly introduced, the advantage of a PDF/VT-compatible printer may not be feasible if data remains in PDF file format.

In contrast, when all PDF files are converted into PDF/VT format and JDF files describing print setting for the PDF/VT files are created, the existing PDF-compatible printer cannot perform printing corresponding to the print setting.

In addition, when a PDF file is converted into PDF/VT format, the creation of a hierarchical structure or the addition of metadata need to be performed so as to facilitate print setting by means of PDF. Thus, Japanese Patent Laid-Open No. 1999-250041 discloses a method for extracting a logical structure such as a hierarchical structure, a reference structure, a relational structure, or the like from a layout of a document image to be able to convert the logical structure into a different format. Japanese Patent Laid-Open No. 2006-244467 discloses a method for adding information representing a hierarchical structure as annotation to each page of PDF to automatically create a hierarchy in accordance with the information. However, these methods are undesirably compatible with only a structure represented explicitly in a document and are not compatible with a structure including a VDP-specific repetition.

SUMMARY OF THE INVENTION

According to an aspect of the present invention, an information processing apparatus is provided that includes a configuration information creating unit configured to create configuration information for PDL data; a print setting unit configured to make a print setting for the configuration information; a print control unit configured to control printing in accordance with the configuration information and the print setting; a rule creation unit configured to create a rule for creating the configuration information; a rule application unit configured, to apply the rule to the PDL data; a printer designation unit configured to designate a printer for printing; and a conversion unit configured to convert a page description language of the PDL data into another page description language depending on capabilities of the printer, wherein the rule creation unit creates a repetition rule corresponding to a repetition element, and the rule application unit creates a repetition structure for the configuration information using the repetition rule.

According to the present invention, a print setting utilizing a hierarchical structure and metadata can be made using configuration information such as a JDF file while holding a file described in the existing page description language such as a PDF file. According to the present invention, a hierarchical structure including a repetition specific to variable printing can be defined.

According to the present invention, both of the existing PDF printer and a new PDF-compatible printer can perform printing reflecting the print setting using existing PDF files and newly created JDF files. According to the present invention, a printer for variable printing (e.g., a PDF/VT-compatible printer) can perform printing by taking an advantage of PDF/VT using existing PDF files and newly created JDF files.

Note that the format of a file described, in the existing page description language (hereinafter referred to as "PDL") is not limited to PDF but any PDL format which has a description capability in units of pages and is accessible in units of pages may be used. The file format after conversion of a page description language is not limited to PDF/VT, but any PDL format having a function of any or both of hierarchical structure and metadata may also be used. A job ticket format is not limited to JDF, but any job ticket format capable of describing a desired print, setting may be used.

Further features of the present invention will become apparent from the following description of exemplary embodiments with reference to the attached drawings.

BRIEF DESCRIPTION OF THE DRAWINGS

FIG. 8A is a diagram illustrating an example in which the connection line is validated by designating the ending condition.

FIG. 8B is a diagram illustrating an example in which the connection line is validated by designating the starting condition.

FIG. 8C is a diagram illustrating an example in which a link condition has been designated to a valid connection line.

FIG. 14 is a diagram illustrating an example of the XML representation of configuration information.

DESCRIPTION OF THE EMBODIMENTS

First Embodiment

Hereinafter, preferred embodiments of the present invention will be described with reference to the attached drawings.

<Configuration of POD System>

Figure 1:
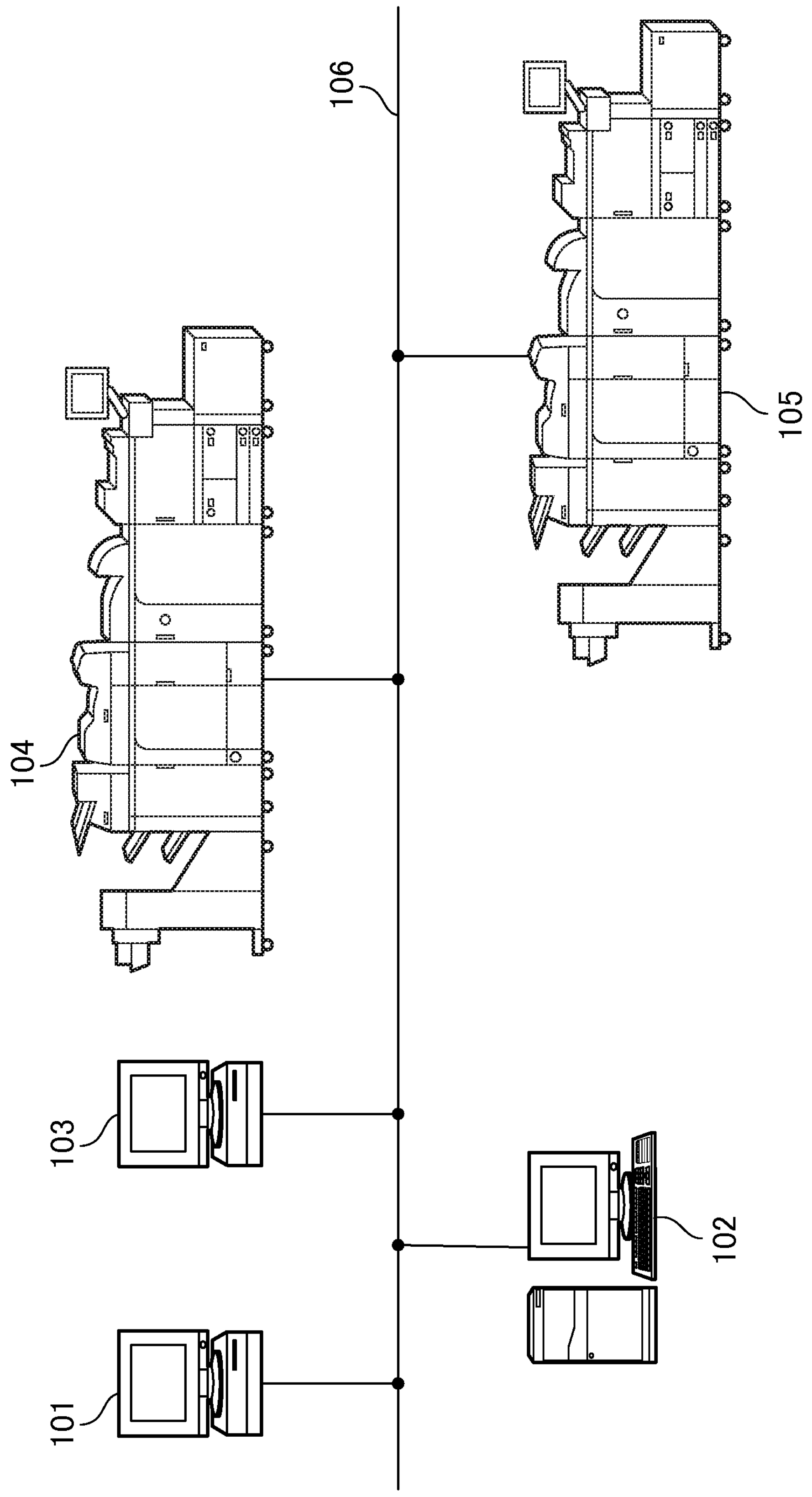
FIG. 1 is a diagram illustrating the configuration of the information processing apparatus of the present invention.

FIG. 1 is a schematic diagram illustrating the configuration of an information processing apparatus according to an embodiment of the present invention. The information processing apparatus includes a print job creation computer (PC) 101, a file server 102, a print operator PC 103, a PDF-compatible printer 104, and a PDF/VT-compatible printer 105. These units are connected to each other via a network 106.

The print job creation PC 101 creates a print job and stores the print job in the file server 102. Data is read from/written to the file server 102 via the network 106. The print operator PC 103 changes a print job acquired from the file server 102 as appropriate and transmits the print job to the PDF-compatible printer 104 or the PDF/VT-compatible printer 105. The PDF-compatible printer 104 or the PDF/VT-compatible printer 105 prints the received print job.

In one embodiment of the present invention, PDF is used, as the existing file format of PDF data, but the present invention is not limited thereto. Any format may be used as long as PDL data, is described in PDF that, has a description capability in units of pages and is accessible to the page using the page number or by way of direct reference or indirect reference. For example, the file format may also no PDF/X.

In one embodiment of the present invention, PDF/VT (format for variable printing) is used, as a file format after conversion, but the present invention is not limited thereto said may also be applicable to other file formats. Any format may be used as long as PDL has a function of any or both of hierarchical structure and metadata and is capable of performing print control by accessing any or both of the hierarchical structure and metadata from the outside.

In one embodiment of the present invention, JDF is used as a job ticket format, but the present invention is not limited thereto. Any format which is capable of describing print settings suitable for printing by a print workflow may be used.

In one embodiment of the present invention, PCs and servers provide individual functions, but the present invention is not limited thereto. Individual functions may further be distributed to a plurality of computers. Some or all of PCs and servers may to the same computers. As a program constituting a print workflow, workflow software for managing the overall workflow and a management information system (hereinafter abbreviated as "MIS") that stores various information in association with a print job may also be present. A Web to Print program for sending a print job, a device manager for managing a device such as a printer, a job manager for managing a print job, and other programs may also be present.

In one embodiment of the present invention, a PDF-compatible printer and a PDF/VT-compatible printer are provided for separate use depending on capabilities thereof, but the present invention is not limited thereto. A plurality of printers having the same capabilities may also foe present. The present invention is also applicable to both the case where only a PDF-compatible printer is present and the case where only a PDF/VT-compatible printer is present.

In one embodiment of the present invention, PCs, servers, and printers are connected to each other via a network, but the present invention is not limited thereto. A portion of PCs, servers, and printers may also be present on a remote network so as to establish remote connection with other PCs, servers, and printers. A portion of the functions may be executed as a Web service through the Internet. A portion of PCs and servers may also be executed, as so-called a cloud service on the Internet.

<Configuration of Computer Device>

Figure 2A:
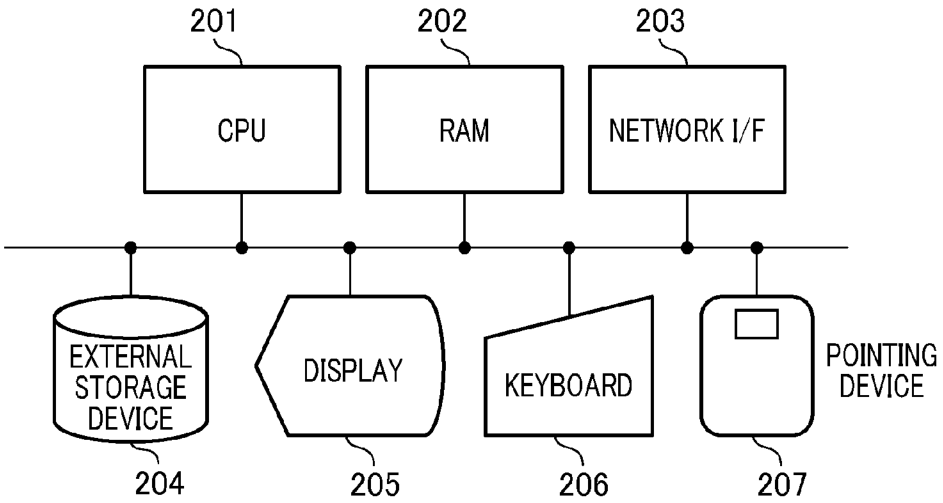
FIG. 2A is a diagram illustrating the configuration of a PC as the information processing apparatus of the present invention.

Next, a description will be given of the configuration of a computer device according to an embodiment of the present invention with reference to FIGS. 2A and 2B. FIG. 2A is a block diagram illustrating an example of the configuration of the print job creation PC 101, the file server 102, and the print, operator PC 103.

A CPU 201 controls the overall apparatus in accordance with a control program stored in a RAM 202. The internal storage unit 202 is a RAM or the like that stores the control program of the apparatus to be executed by the CPU 201 and data such as document image or the like. A network interface 203 transmits/receives data or the like through the connection with the network 106 under the control of the CPU 201. An external storage device 204 is a magnetic disk or the like for storing data. The reference number 205 indicates a display the reference number 206 is a keyboard, and the reference number 207 is a pointing device such as a mouse. A program stored in the RAM 202 uses the functions of the OS (Operating System) stored in the RAM 202 as appropriate so as to perform a predetermined operation. The program stored, in the RAM 202 reads/writes the content of data that, is temporarily stored in the RAM 202, reads/writes data on the external storage device 204, and transmits/receives data through the network interface 203. The program stored in the RAM 202 receives an input from the keyboard 206 or the pointing device 207, and displays the input on the display 205.

In a client PC 101, the program stored in the RAM 202 creates a print job by receiving an input from the keyboard 205 or the pointing device 207, and writes the print job in the file server 102 through the network interface 203. The file server 102 stores a print job in the external storage device 204. When the program stored in the RAM 202 receives a command for reading/writing a print job through the network interface 203, the CPU 201 executes the command and transmits the result of execution through the network interface 203.

In a print operator PC 103, the program stored in the RAM 202 receives an input from the keyboard 206 or the pointing device 207 and reads a print job from the file server 102 through the network interface 203. Then, the print operator PC 103 changes the format of the print, job as appropriate and then transmits the print job to the PDF-compatible printer 104 or the PDF/VT-compatible printer 105 through the network interface 203.

Figure 2B:
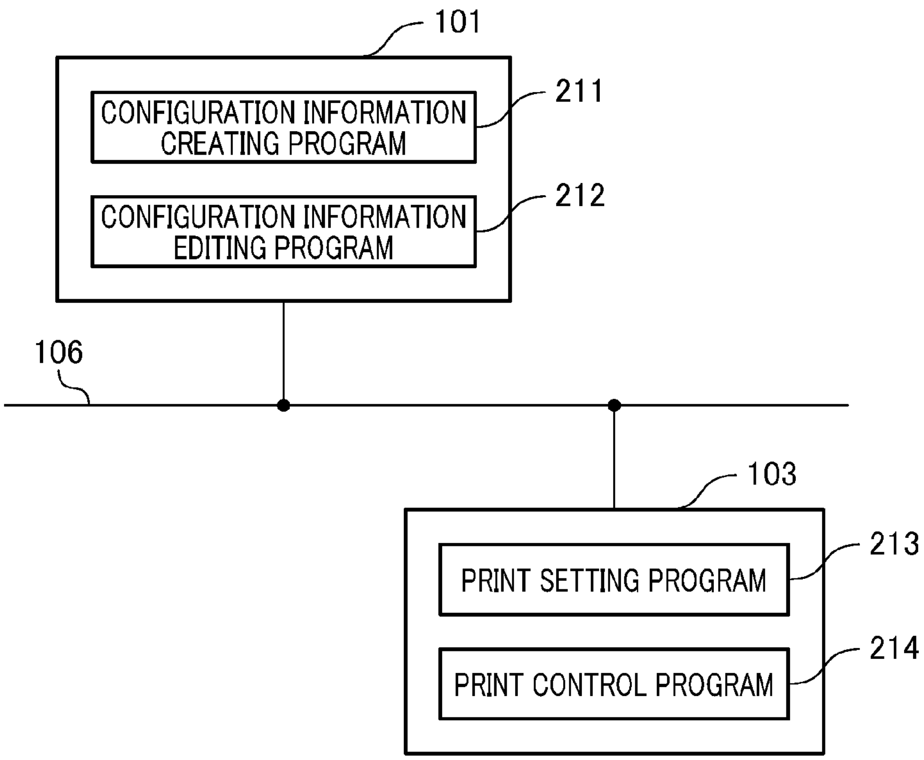
FIG. 2B is a diagram illustrating the functional configuration of PCs 101 and 102.

FIG. 2B is a functional block diagram illustrating a control program stored in the RAPS 202 of the print job creation PC 101. The control program includes a configuration information creating program 211 (configuration information creating unit) that creates configuration information 403 (FIG. 4) and a configuration information editing program 212 (configuration information editing unit) that adds/deletes/changes a portion of configuration information. The print operator PC 103 includes a print setting program 213 (print setting unit) that creates a portion of a JDF 404 among print information 401 and a print control program 214 (print control unit) that controls print instructions or the like using print information.

<Structure of PDF/VT>

Figure 3:
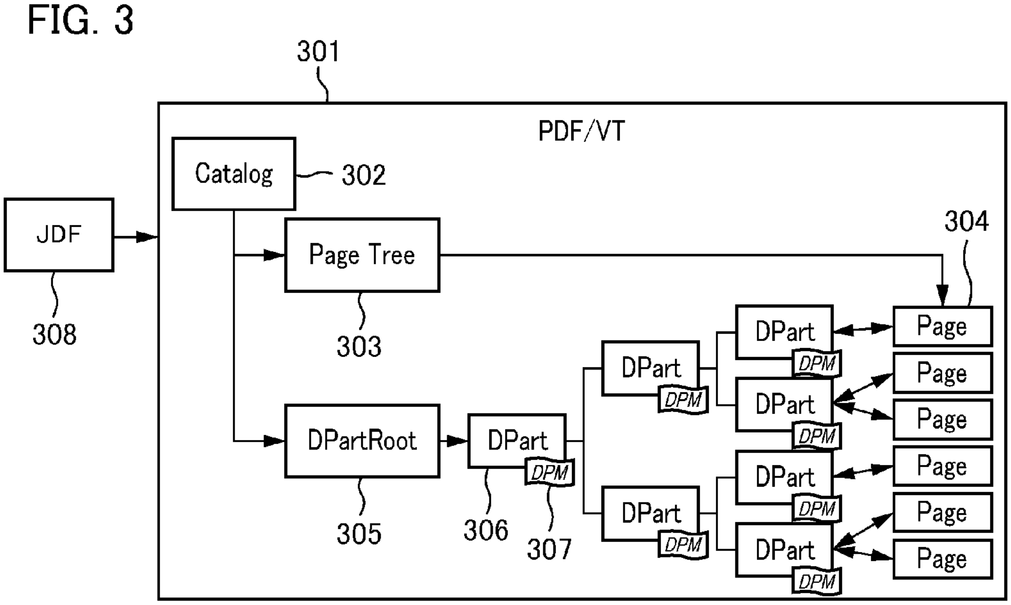
FIG. 3 is a diagram illustrating the structure of a PDF/VT document.

Next, a description will be given of the structure of a PDF/VT document with reference to FIG. 3. FIG. 3 is a schematic block diagram illustrating the logical structure of a PDF/VT document 301 stored, in a PDF/VT file. A Catalog dictionary 302 stores references to various objects present in the PDF/VT document 301. These references include references to a Page Tree 303 and references to a DPartRoot dictionary 305. The Page Tree 303 holds the sequence of Page objects 304 present in the PDF/VT document 301. The Page object 304 holds references to an object (s) required, for rendering one page. The DPartRoot dictionary 305 holds references to root nodes present in a DPart (Document Part) hierarchical structure. A DPart dictionary 306 represents each node constituting the DPart hierarchical structure. A DPM (Document Part Metadata) 307 holds metadata associated with each DPart dictionary. The terminal nodes of the DPart hierarchical structure hold, references to the Page objects 304. An external JDF file 308 can describe print settings referencing the DPart hierarchical structure or DPM metadata of the PDF/VT document 301.

The Catalog dictionary 302, the Page Tree 303, and the Page object 304 are structures that are originally defined in PDF. The references from the DPartRoot dictionary 305, the DPart dictionary 306, the DPM dictionary 307, and the Catalog dictionary 302 to the DPartRoot dictionary 305 and the references from the DPart dictionary 300 to the Page object 304 are structures that are the expanded use of PDF.

<Configuration of Print Information>

Figure 4:
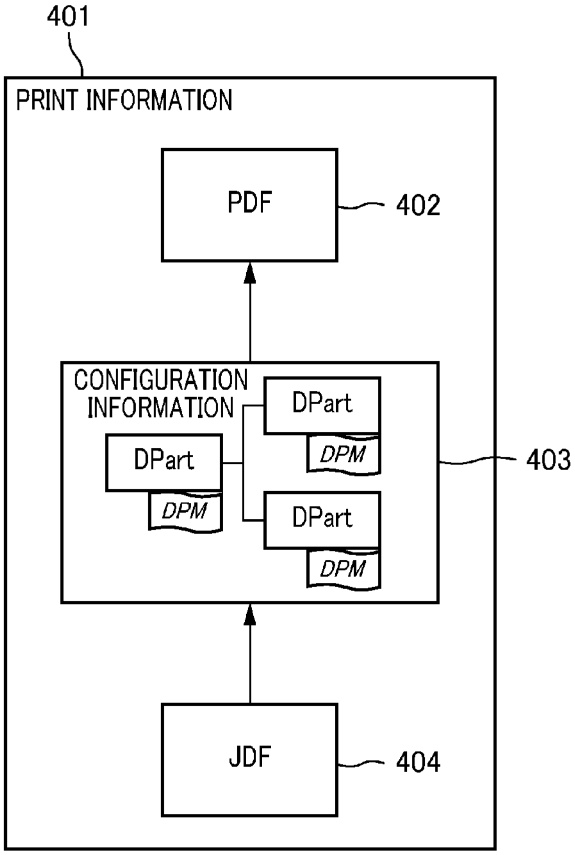
FIG. 4 is a diagram illustrating the structure of print information.

Next, a description will be given of the structure of print information according to an embodiment of the present invention with reference to FIG. 4. FIG. 4 is a schematic block diagram illustrating the logical structure of the print information 401 which is the format of a print job to foe used in the embodiment of the present invention. The reference number 402 indicates a PDF file. The configuration information 403 refers to the PDF file 402 and is able to hold the same structure as the DPart hierarchical structure or the DPM metadata of the PDF/VT document 301.

The configuration information 403 is different from the DPart hierarchical structure of the PDF/VT document 301 in two points: the first, point is that there is no reference from the DPartRoot dictionary 305 and the second point is that the terminal node does not hold a reference to the Page object 304. Instead, the terminal node of the configuration information 403 holds the page number of a PDF file to be referred to. A JDF file 404 refers to the DPart hierarchical structure or the DPM metadata of the configuration information 403 to thereby describe print settings. When the print, information 401 is held, in an external storage device 204, the PDF file 402, the configuration information 403, and the JDF file 404 are archived in ZIP format.

Examples of the configuration information 403 and a PDF file will be described below with reference to FIGS. 9C and 11. Examples of print information will be described below with reference to FIGS. 17 and 18. The data structure upon holding configuration information in the RAM 202 will be described below with reference to FIGS. 12 and 13. The expression format upon holding configuration information in the external storage device 204 will be described below with reference to FIG. 14.

In one embodiment of the present invention, only one PDF file is used, but the present invention is not limited thereto. A plurality of PDF files may also be used, such that a reference to the page of each PDF file is made from configuration information. In one embodiment of the present invention, the same structure as that of PDF/VT is used as configuration information, but the present invention is not limited thereto. Any format may be used as long as the structure is represented by a hierarchical structure and metadata. In one embodiment of the present invention, configuration information holds the page number of a PDF file to be referred to, but the present invention is not limited, thereto. Any format may be used as long as references to pages in a PDF file can be made. For example, the Reference XObject of PDF may also be used.

In one embodiment of the present invention, print information is archived in ZIP format, but the present invention is not limited thereto. Various archive formats such as a LZH format may also be used. Various package formats such as OPC (Open Package Convention), MIME (Multipurpose Internet Mail Extensions), or the like may also be used. Alternatively, the directory structure of a file system may also be used so as not to archive or package files in print information.

<Overall Processing>

Figure 5A:
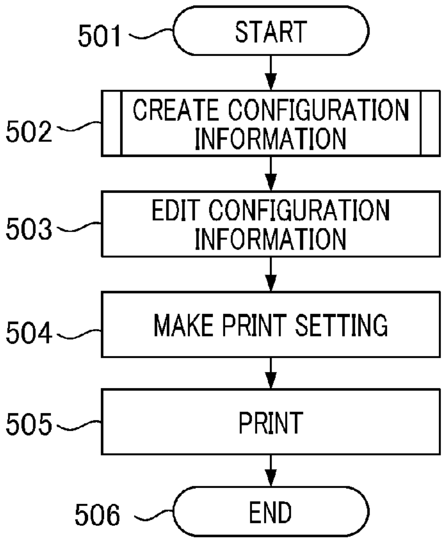
FIGS. 5A to 5C are flowcharts illustrating overall processing performed by the information processing apparatus of the present invention.

Next, a description will be given of overall processing performed by an information processing apparatus according to an embodiment of the present invention with reference to the flowchart of FIGS. 5A to 5C. FIG. 5A shows overall processing performed by an information processing apparatus.

Firstly, the process starts at step S501. Next, in step S502, the configuration information creating program 211 (configuration information creating unit) of the print job creation PC 101 receives an input from a user, creates the configuration information 403, and stores the configuration information 403 as a portion of print information in the file server 102. The details of configuration information creation processing will be described, below in steps S507 to S513.

In step S503, the configuration information editing program 212 (configuration information editing unit) of the print job creation PC 101 receives an input from a user, and edits a portion of the configuration information 403 among the print information 401 stored, in the file server 102. Editing of the configuration information 403 is processing for adding/deleting/changing a portion of the configuration information 403 created by configuration information creation processing. The detailed description will not be provided because it is apparent from the creation processing.

In step S504, the print setting program (print setting unit) of the print operator PC 103 receives an input from a user, and creates a portion of the JDF 404 among the print information 401 stored in the file server 102. The details of print setting processing will be described below with reference to FIGS. 17 and 18. In step S505, the print control program 214 (print control unit) of the print operator PC 103 receives an input from a user, and provides print instructions using the print information 401 stored in the file server 102. The details of print processing will be described below in steps S514 to S522. The process ends at step S506.

Figure 5B:
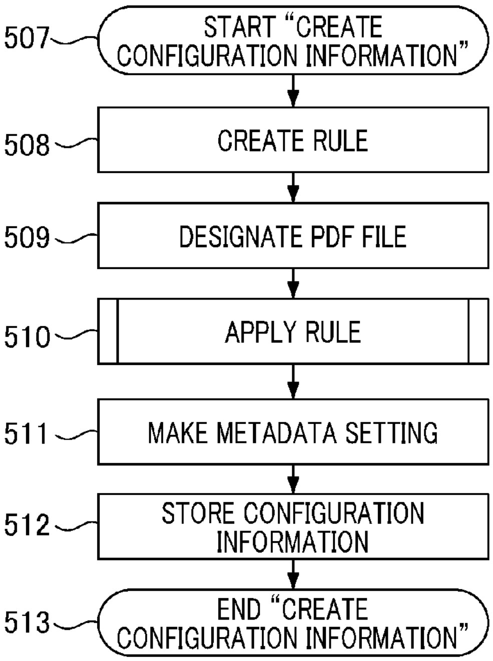

FIG. 5B is a flowchart illustrating the details of configuration information creation processing 505 performed by the configuration information creating program 211 of the print job creation PC 101. The process starts at step S507.

In step S508, the configuration information creating program 211 serving as a rule creation unit receives an input from a user, and creates a rule for creating the configuration information 403. A rule creation method will be described below with reference to FIGS. 6 to 10C. In step S509, the configuration information creating program 211 accepts the designation of a PDF file (PDL data) stored in the print job creation PC 101 or the file server 102 from a user in order to apply the rule created in step S508.

In step S510, the configuration information creating program 211 serving as a rule application unit applies the rule created in step S508 to the PDF file designated in step S509 to thereby create the configuration information 403. The details of rule application processing will be described below with reference to FIG. 15. FIG. 16A, FIG. 16B, and FIG. 16C. In step S511, the configuration information creating program 211 receives an input from a user, and sets metadata to the configuration information 403 created in step S510. The details of metadata setting will be described below with reference to FIG. 11.

In step S512, the configuration information creating program 211 receives an input from a user, and stores the configuration information 403 created/edited in step S510 and step S511 as a portion of print information in the file server 102. The process ends at step S513.

Figure 5C:
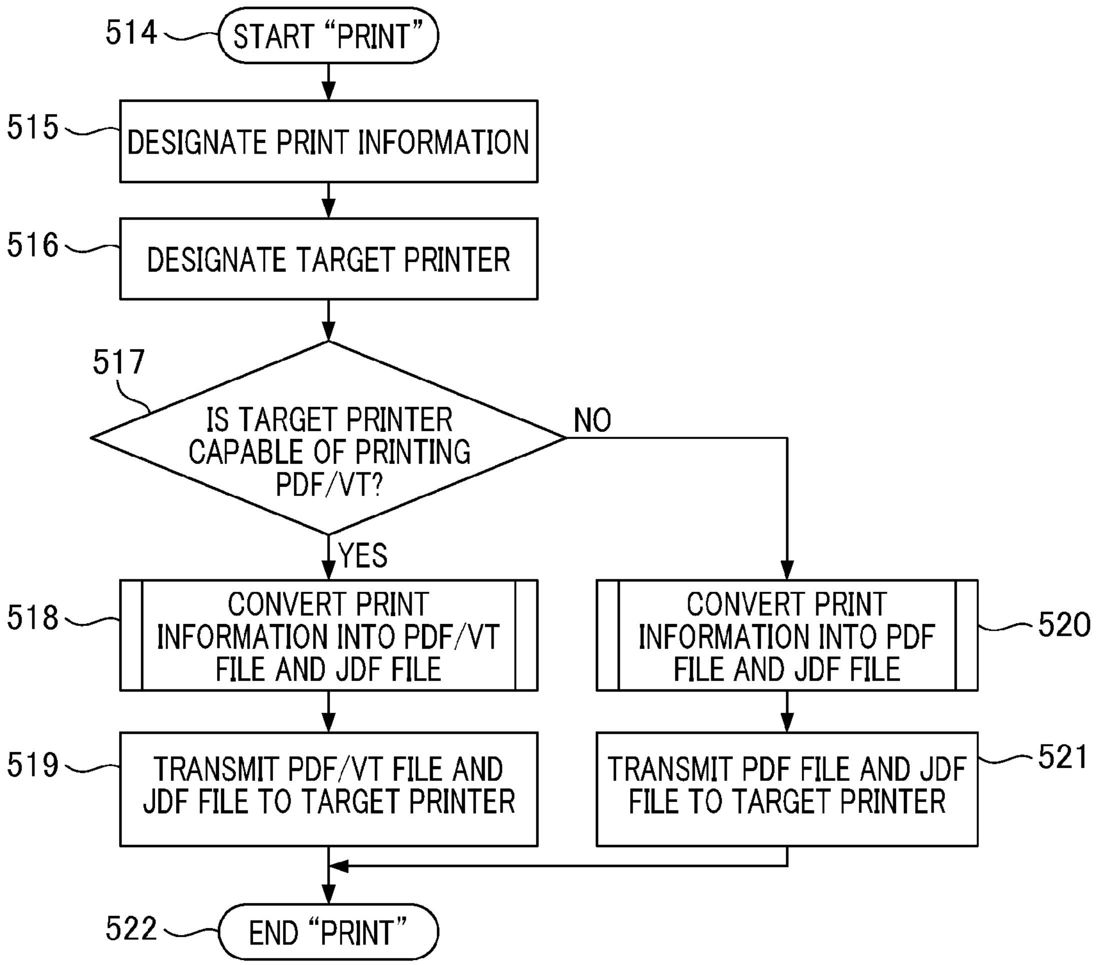

FIG. 5C is a flowchart illustrating the details of print processing 505 performed by the print control program 214 of the print operator PC 103. The process starts at step S514.

In step S515, the print control program 214 accepts the designation of any one of the print information 401 stored in the file server 102 from a user. In step S516, the print control program 214 serving as a printer designation unit accepts the designation of a printer for printing from a user.

In step S517, the print control program 214 determines whether or not the printer designated in step S516 can print a PDF/VT file. Determination is made by querying capabilities of the printer designated in step S516 from the print control program 214 using, for example, a format such as JMF (Job Messaging Format) so as to examine the capabilities. Alternatively, capabilities of all printers usable on the network may be statically stored in a location accessible by the print control program 214 in advance to thereby examine capabilities of the printer designated in step S516 by residing the capabilities thereof by the print control program 214. When the printer can print a PDF/VT file, the process advances to step S518. Otherwise, the process advances to step S520. In the present embodiment, when a user designates the PDF-compatible printer 104, the process advances to step S520. When a user designates the PDF/VT-compatible printer 105, the process advances to step S518.

In step S518, the print control program 214 serving as a conversion unit, converts print information designated in step S515 to thereby create a PDF/VT file and a JDF file. The details of PDF/VT conversion processing will be described below with reference to FIG. 19A and FIG. 19B. In step 3519, the print control program 214 transmits the PDF/VT file and the JDF file created in step S518 to the printer designated in step S516. In step S520, the print control program 214 serving as a conversion unit, converts print, information designated, in step S515 to thereby create a PDF file and a JDF file. The details of PDF conversion processing will be described, below with reference to FIG. 20A and FIG. 20B. In step S521, the print control program 214 transmits the PDF file and the PDF file created, in step S520 to the printer designated in step S516. The process ends at step S522.

<Rule Creation Screen>

Next, a description will be given of a rule creation screen to be used as a rule creation unit in step S508 with reference to FIGS. 6 to 8C. As described above, the configuration information 403 is created, by applying a rule to be created, to a PDF file.

Figure 6:
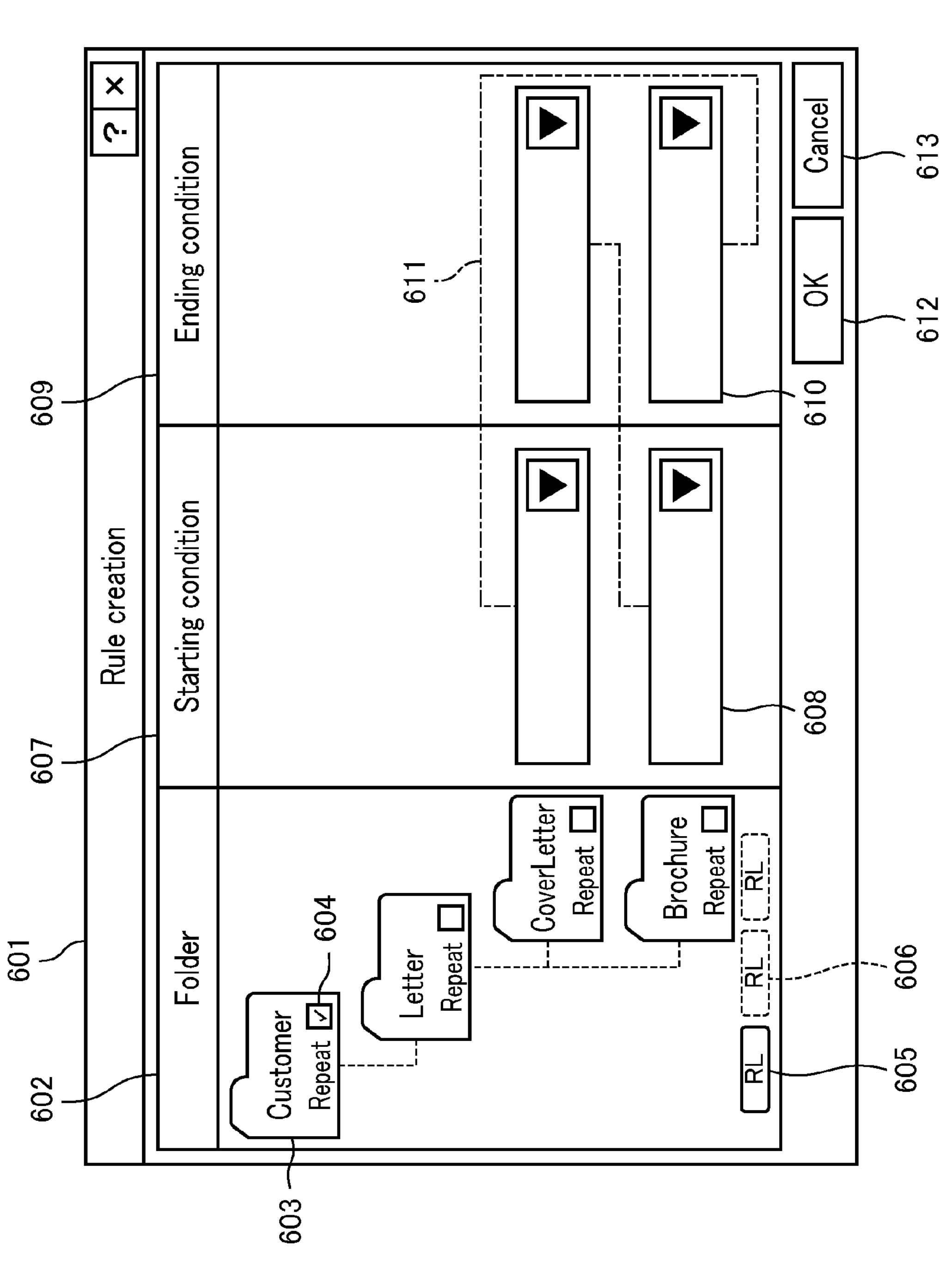
FIG. 6 is a diagram illustrating a rule creation screen of the information processing apparatus of the present invention.

FIG. 6 is a diagram illustrating an example of a rule creation screen to be displayed on the display 205 by the configuration information creating program 211 of the print job creation PC 101. A rule creation screen 601 includes a folder creation pane 602, a starting condition designation pane 607, and an ending condition designation pane 609.

In the folder creation pane 602, the configuration information creating program 211 receives an input from a user, creates/edits folders having a hierarchical structure, and displays the result of the hierarchically-structured folders. The created hierarchical structure is used as a hierarchical structure upon creation of the configuration information 403. Since a method for creating/moving/changing/deleting hierarchically-structured folders by receiving an input from a user is well-known in Internet Explorer for Microsoft Windows (registered trademark) and so on, the detailed description thereof will not be provided. The reference number 603 is a folder created by the folder creation pane 602. Each folder can be designated by its name. The levels of she folders are called a "first level", a "second level", and the like from the left. In the case of the rule creation screen shown, in FIG. 6, a Customer folder is created on the first level, a Letter folder is created on the second level, and a Cover Letter folder and a Brochure folder are created on the third level.

A check box 604 is used for causing a user to instruct the repetitive use of a folder in the configuration information 403. In the case of the rule creation screen shown in FIG. 6, the Customer folder is designated as a reposition folder (i.e., repetition element). When the rule is applied to a PDF file, the repetition folder is repeatedly used as a repetition rule in the hierarchical structure of the configuration information 403.

Buttons 605 and 606 are used for causing a user to instruct the fact that the level of a folder is at a record level (hereinafter abbreviated as "RL"). Here, a description will be given of a record level. In VDP, a print job is generated by applying each row (record) of the data source to a VDP document template. Thus, a VDP print job typically has a structure such that a page group generated by the application of one record is repeated by the number of rows in the data source. The record level refers to the level of a folder in which the repetition is executed. The button 605 indicates the state that the record level is valid and indicates the fact that the level of the folder is at the record level. The button 606 indicates the state that the record level is invalidated and indicates the fact that the level of the folder is not at the record level. In the levels of the folders created by the folder creation pane 502, only one level can be designated as the record level. Also, only one folder mast be present on the level and the folder must be designated as the repetition folder. In the case of the rule creation screen shown in FIG. 6, the first level can only be designated as the record level. When a certain level is designated as the record level, the configuration information creating program 211 invalidates all buttons for other levels.

In the starting condition designation pane 607, the configuration information creating program 211 accepts an input from a user, and designates the starting condition to the terminal folders (folders of the rightmost level) among the folders created by the folder creation pane 602. When the rule is applied to a PDF file, the designated starting condition is used upon allocation of pages of a PDF file to folders. A drop down list box 608 is used for causing a user to instruct, the starting condition to an individual terminal folder.

In the ending condition, designation pane 609, the configuration information creating program 211 accepts an input from a user, and designates the ending condition to the terminal folders among the folders created by the folder creation, pane 602. When the rule is applied to a PDF file, the designated ending condition is used upon allocation of pages of a PDF file to folders. A drop down list box 610 is used for causing a user to instruct the ending condition to an individual terminal folder.

A connection line 611 indicates a connected relationship between an ending condition and a starting condition. For the two adjacent terminal folders in the folder pane 602, the configuration information creating program 211 displays the ending condition for the preceding terminal folder (a folder located at the upper side in FIG. 6) and the starting condition for the subsequent terminal folder (a folder located at the lower side in FIG. 6) in a connected manner. In the case of the rule creation screen shown in FIG. 6, the ending condition for the Cover Letter folder is in connection with the starting condition for the Brochure folder. When a repetition folder is present, the configuration information creating program 211 displays the ending condition for the last terminal folder (a folder located at the lowermost side in FIG. 6) and the starting condition for the leading terminal folder (a folder located at the uppermost side in FIG. 6) in a connected manner among the terminal folders which are at the lower level of the repetition folder. In the case of the rule creation screen shown in FIG. 6, the ending condition for the Brochure folder is in connection with the starting condition for the Cover Letter folder. A connection line has two connection states, i.e., the invalid state and the valid state. In the rule creation screen shown in FIG. 6, all connection lines are in the invalid state. A connection line can be validated by designating the starting condition or the ending condition as described below. When all the connection lines are validated, the rule is applicable to a PDF file. The reference number 612 indicates an OK button that saves the rule creation content. The reference number 613 indicates a cancel, button that discards the rule creation content.

Figure 7A:
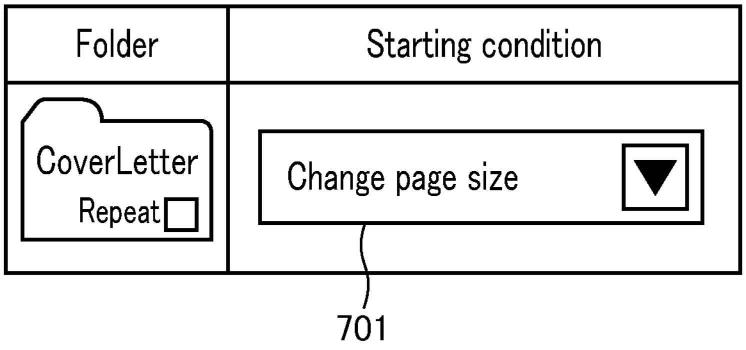
FIGS. 7A and 7B are diagrams illustrating an example in which a starting condition has been designated in the rule creation screen.

FIG. 7A is a diagram illustrating an exemplary starting condition which is specifiable by a user through the starting condition pane 607 on the rule creation screen 601. In the starting condition designation, drop down list box 603 (FIG. 6), the starting condition "paper size change" (701) is selected for the Cover Letter folder. When there is a folder for which the starting condition has been designated, the configuration information creating program 211 checks the change in the page size (for example, A4 size→A3 size) of a POP file upon application of the rule to the PDF file. Then, for the folder for which the starting condition has been designated, page allocation is started from a page of which, the page size of a PDF file has been changed.

Figure 7B:
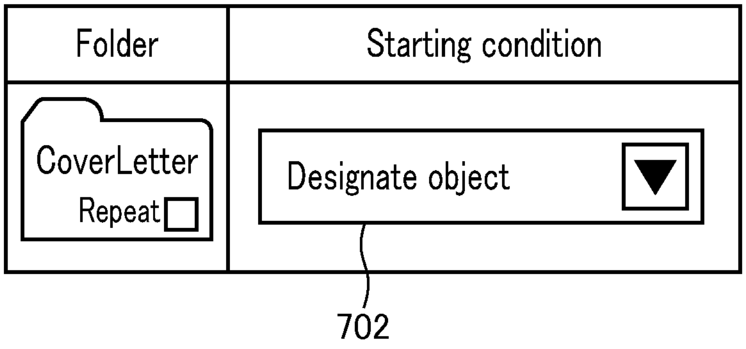

FIG. 7B is a diagram illustrating an exemplary starting condition which is specifiable by a user through the starting condition pane 607 on the rule creation screen 601. In the starting condition designation drop down list box 603 (FIG. 6), the starting condition "object designation" (702) is selected for the Cover Letter folder. When there is a folder for which the starting condition has been designated, the configuration information creating program 211 checks whether or not the object designated in pages of a PDF file is present at the designated position upon application of the rule to the PDF file. Then, for the folder for which the starting condition has been designated, page allocation is started from a page in which the designated object is present at the designated position.

Figure 7C:
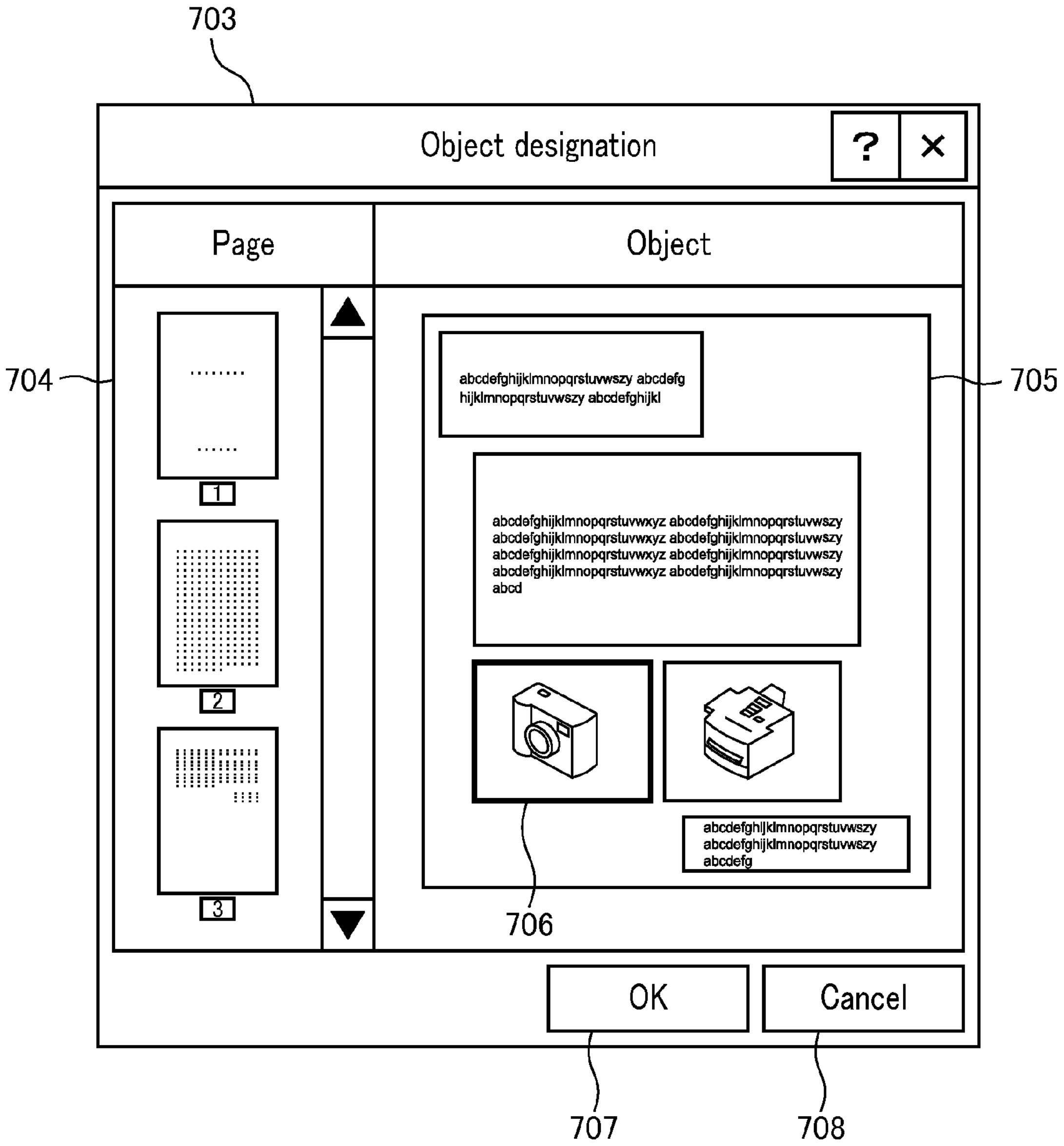
FIG. 7C is a diagram illustrating an example of object designation.
Figure 7D:
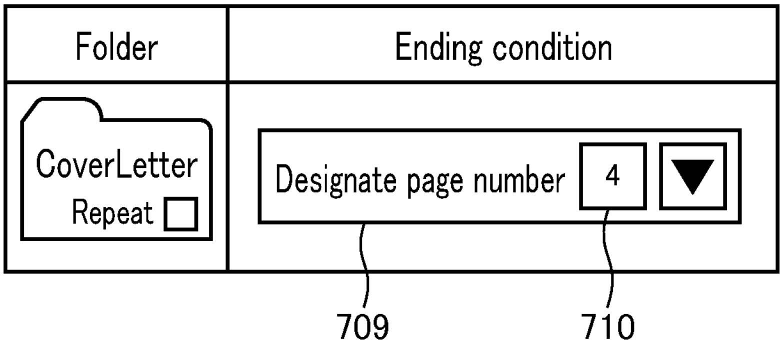
FIGS. 7D and 7E are diagrams illustrating an example in which an ending condition has been designated in the rule creation screen.
Figure 7E:
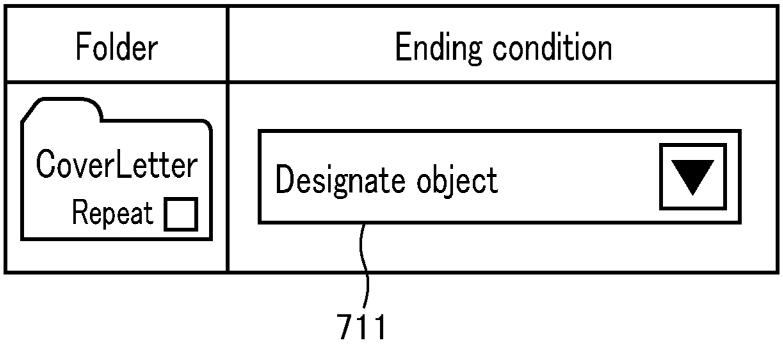

FIG. 7C is a diagram illustrating an example of the object designation screen to be displayed on the display 205 by the configuration information creating program 211 when the starting condition "object designation" shown in FIG. 7E is selected. In an object designation screen 703, the configuration information creating program 211 receives an input from a user and causes the user to designate a PDF file used in the object designation. For example, in the case of Microsoft Windows (registered trademark), a PDF file may be designated by drag & drop from a desktop screen or an explorer.

In a page designation pane 704, the configuration information creating program 211 displays all pages that are present in the designated PDF file. Then, the configuration information creating program 211 causes a user to select a page to which an object is selected.

In an object designation pane 705, the configuration information creating program 211 displays the content of the page selected by the page designation pane 704. Then, the configuration information creating program 211 causes a user to select, one of objects constituting the page display. The configuration information creating program 211 holds the content and the position of the selected object and uses the selected object upon application of the rule to the PDF file. The reference number 706 indicates the selected object. The reference number 707 indicates an OK button that saves the object designation content. The reference number 708 indicates a cancel button that discards the object designation content.

FIG. 7D is a diagram illustrating an exemplary ending condition which is specifiable by a user through the ending condition pane 609 on the rule creation screen 601. In the ending condition designation drop down list box 610 (FIG. 6), the ending condition "page number designation" (709) is selected for the Cover Letter folder, and the number of pages is input as "4" (710). When there is a folder for which the ending condition has been designated, the configuration information creating program 211 counts the number of pages of a PDF file upon application of the rule to the PDF file. Then, after starting the allocation of pages of the PDF file to the folder for which the starting condition has been designated, the configuration information creating program 211 allocates the designated number of pages (four pages in the example shown in FIG. 7D) to the folder, and ends the page allocation to the folder.

FIG. 7E is a diagram illustrating an exemplary ending condition which is specifiable by a user through the ending condition pane 609 on the rule creation screen 601. In the ending condition designation drop down list box 610, the ending condition "object designation" (711) is selected for the Cover Letter folder. When there is a folder for which the ending condition has been designated, the configuration information creating program 211 checks whether or not the object designated in pages of a PDF file is present at the designated position upon application of the rule to the PDF file. Then, after starting the allocation of pages of the PDF file to the folder for which the ending condition has been designated, the configuration information creating program 211 allocates a page in which the designated object is present at the designated position to the folder, and ends the page allocation to the folder. The object designation method is the same as that shown in FIG. 7C.

FIG. 8A is a diagram illustrating an example in which the ending condition and the starting condition which are connected to each other and are in the valid state on the rule creation screen 601. In the folder creation pane 602, two terminal folders, i.e., the Cover Letter folder and the Brochure folder are created. In the ending condition designation drop down list box 610 (FIG. 6), the ending condition "page number designation" is selected for the Cover Letter folder which is the preceding terminal folder, and the number of pages is input as "4" (801). After starting the allocation of pages of the PDF file to the Cover Letter folder, the configuration information creating program 211 allocates four pages to the Cover Letter folder, and then ends the page allocation to the Cover Letter folder. Then, the page allocation to the Brochure folder which is the subsequent terminal folder is started. In other words, if the valid ending condition is designated to the Cover Letter folder which is the preceding terminal folder, no starting condition needs to be designated to the Brochure folder which is the subsequent, terminal folder. Thus, the configuration information creating program 211 displays that a connection line 802 between both terminal folders is in the valid state.

FIG. 8B is a diagram illustrating an example in which the ending condition and the starting condition which are connected to each other and are in the valid state on the rule creation screen 601. In the folder creation pane 602, two terminal folders, i.e., the Cover Letter folder and the Brochure folder are created. In the starting condition designation drop down list box 608 (FIG. 6), the starting condition "object designation" (803) is selected for the Brochure folder which is the subsequent terminal folder. After starting the allocation of pages of the PDF file to the Cover Letter folder, the configuration information creating program 211 finds a page in which the object designated in 803 is present at the designated position, and then start the page allocation to the Brochure folder. In other words, if the valid starting condition is designated to the Brochure folder which is the subsequent terminal folder, no ending condition needs to be designated to the Cover Letter folder which is the preceding terminal folder. Thus, the configuration information creating program 211 displays that a connection line 804 between both terminal folders is in the valid state.

FIG. 8C is a diagram illustrating an example in which the ending condition and the starting condition which are connected to each other and are in the valid state on the rule creation screen 601. The folder creation pane 602 is the same as those in FIGS. 8A and 8B. An ending condition designation 805 for a Cover Letter folder is the same as 801. A starting condition designation 806 for a Brochure folder is the same as 803.

Since the ending condition for the Cover Letter folder and the starting condition for the Brochure folder are designated, a connection line 805 between two terminal folders is displayed in the valid state. However, in this example, both of the ending condition and the starting condition are designated, and thus, the ending condition may be inconsistent with the starting condition. Thus, the configuration information creating program 211 displays a link condition designation popup menu 308 and causes a user to select the operation of the connection line. There are three selectable operations, i.e., three state transition conditions: "AND", "OR", and "SKIP". When the state transition condition "AND" is selected, the configuration information creating program 211 starts the page allocation to the Brochure folder which is the subsequent terminal folder if the condition of both terminal, folders is satisfied. When the state transition condition "OR" is selected, the configuration information creating program 211 starts the page allocation to the Brochure folder which is the subsequent terminal folder if the condition of any one of terminal folders is satisfied. When the state transition condition "SKIP" is selected, the configuration information creating program 211 skips the page allocation to the Brochure folder which is the subsequent terminal folder if the ending condition for the Cover Letter folder which is the preceding terminal folder is satisfied. Then, the configuration information creating program 211 determines whether or not the page allocation to the Brochure folder which is the subsequent terminal, folder is executed. The details of allocation processing to be performed when the link condition is designated will be described below with reference to FIGS. 16A to 16C.

<Example of Rule Application>

Next, a description will be given by taking an example of how the configuration information 403 is created, by performing rule application processing in step S510 by the configuration information creating program 211 with reference to FIGS. 10A to 10C. Here, only the result of rule application is shown, and the details of rule application processing will be described, below with reference to FIG. 15 and FIGS. 16A to 16G.

Figure 9A:
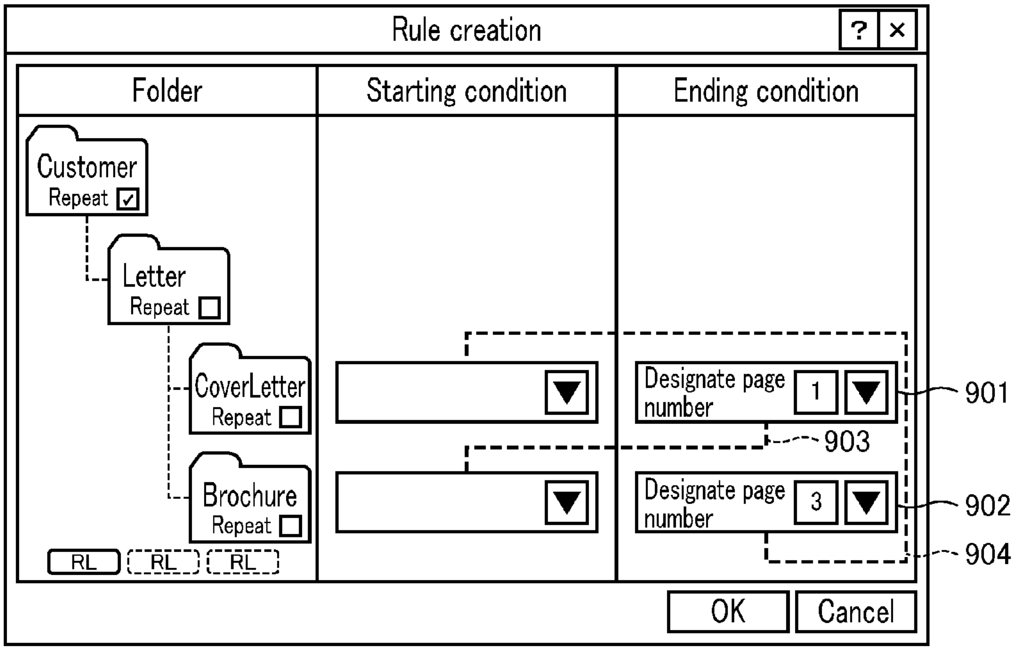
FIG. 9A is a diagram illustrating an example in which a rule has been created, on the rule creation screen.

FIG. 9A is a diagram illustrating an example in which a rule has been created on the rule creation screen 601. The Customer folder is designated as the repetition folder. The level of the Customer folder level is designated as the record level. The terminal folders are the Cover Letter folder and the Brochure folder which are adjacent to each other in this order. In the ending condition designation drop down list box 610, the ending condition "page number designation" is selected for the Cover Letter folder and the number of pages is input as "1" (901). In the ending condition designation drop down list box 610, the ending condition "page number designation" is selected for the Brochure folder and the number of pages is input as "3" (902). The reference number 903 indicates a connection, line between the ending condition for the Cover Letter folder and the starting condition for the Brochure folder. Since the ending condition for the Cover Letter folder which is the preceding terminal folder is designated, the connection line 903 is displayed in the valid state.

The reference number 904 indicates a connection line between the ending condition for the Brochure folder and the starting condition for the Cover Letter folder. The Customer folder is designated as the repetition folder. Thus, among the terminal folders which are at the lower level of the repetition folder, the ending condition for the Brochure folder which is the last terminal folder is in connection with the starting condition for the Cover Letter folder which is the leading terminal folder. Since the ending condition for the Brochure folder which is the preceding terminal folder is designated, the connection line 904 is displayed in the valid state.

Figure 9B:
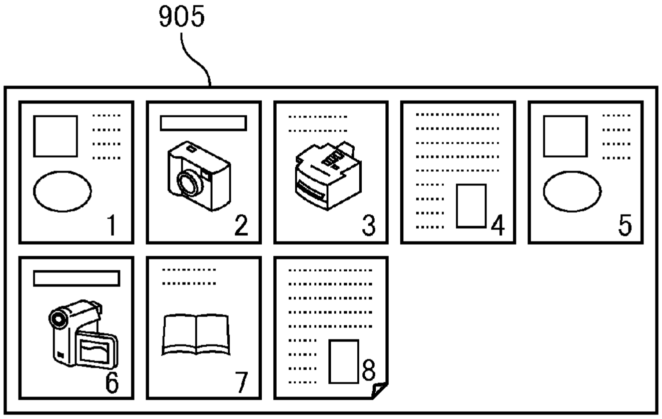
FIG. 9B is a diagram illustrating an example of a PDF file to be input.

FIG. 9B is a diagram illustrating the thumbnail sketch of the content of a PDF file to be input. As shown in FIG. 9B, a PDF file 905 is composed of eight pages.

Figure 9C:
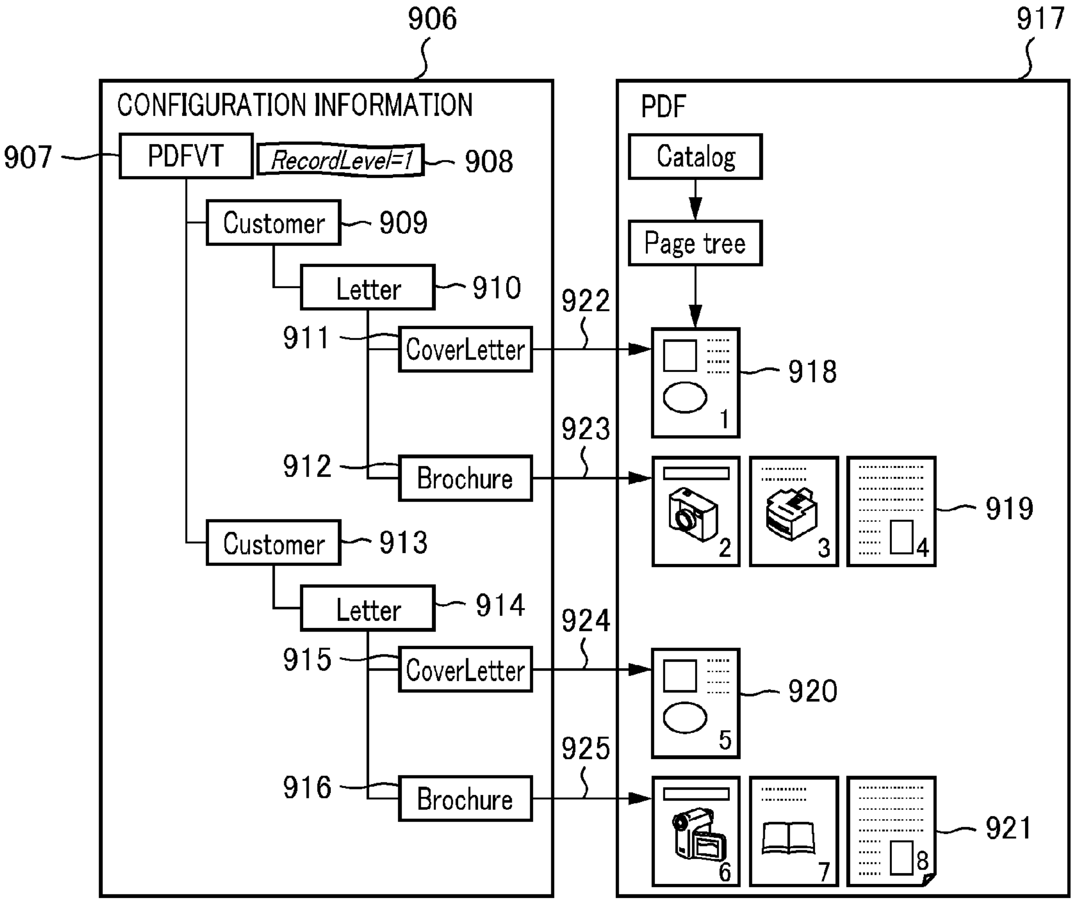
FIG. 9C is a diagram illustrating configuration information created by the present invention.

FIG. 9C is a schematic block diagram illustrating the logical structure of configuration information created as a result of application of the rule created in FIG. 9A to the PDF file shown in FIG. 9B. The reference number 906 indicates the created configuration information. The reference number 907 indicates a root node of the configuration information 906. The name of the root node is always "PDFVT". The reference number 908 is metadata generated in the root node, which corresponds to the fact that the first level is designated as the record level in FIG. 9A. The usage of metadata will be described below with reference to FIG. 19A and FIG. 19B.

The reference numbers 900 to 916 indicate nodes created in the configuration information 906, which correspond to the folders created by the folder creation pane 602 of FIG. 9A. Since the Customer folder has been designated as the repetition folder, the Customer node is repetitively created. The reference number 317 indicates an input PDF file shown, in FIG. 9B. The reference numbers 918 to 921 indicate pages of the PDF file 917. Each of the reference numbers 922 to 925 indicates a link from a terminal node of the configuration information 906 to a page of the PDF file 917. As shown in FIG. 9A, the created rule has been designated, that one page is allocated to the Cover Letter and the three pages are allocated to the Brochure folder. In accordance with the rule, the first one page is linked to a node 911, the next three pages are linked to a node 912, the next one page is linked to a node 915, and the next three pages are linked to a node 916. As described above, a link to a page (or pages) of the PDF file holds the page number (or page numbers) of the page (or pages) of the link destination.

Figure 10A:
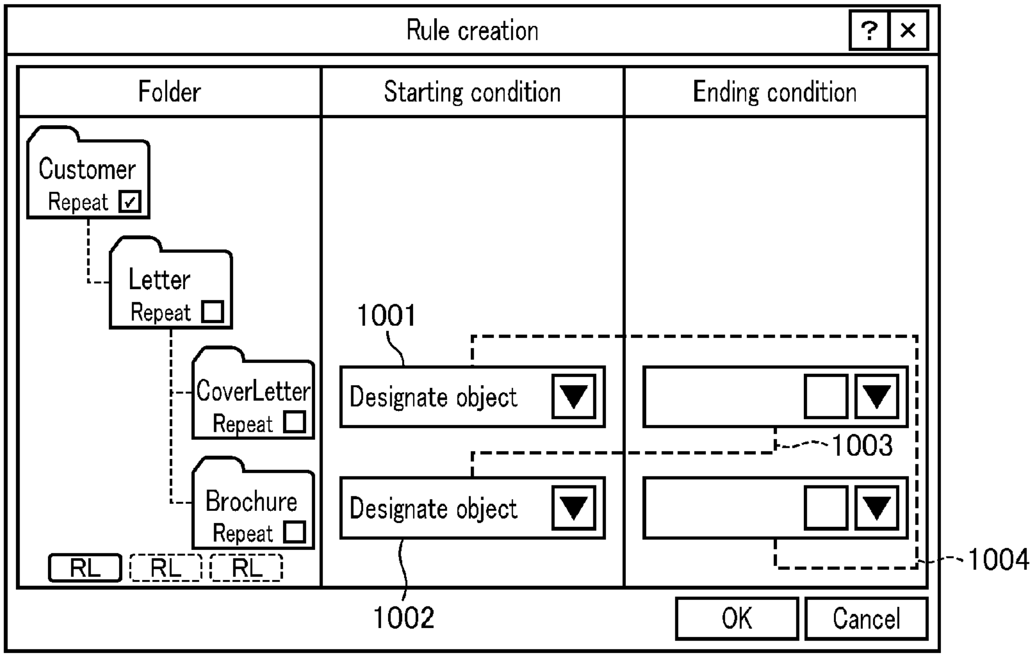
FIG. 10A is a diagram illustrating an example in which a rule has been created on the rule creation screen.

FIG. 10A is a diagram illustrating another example in which a rule has been created on the rule creation screen 601.

The content of the folder creation pane is the same as that shown in FIG. 9A. In the starting condition designation drop down list box 610, the starting condition "object designation" (1001) is selected for the Cover Letter folder. At this time, it is assumed that an object 1006 or 1008 of a PDF file shown in FIG. 10B is designated on the object designation screen 703. The object 1006 and the object 1008 are objects that, have the same content and are rendered at the same position.

Also, in the starting condition designation drop down list box 610, the starting condition "object designation" (1002) is selected for the Brochure folder. At this time, it is assumed that an object 1007 or 1009 of a PDF fife shown in FIG. 10B is designated on the object designation screen 703. The object 1007 and the object 1009 are objects that have the same content and are rendered at the same position.

The reference number 1003 indicates a connection line between the ending condition for the Cover Letter folder and the starting condition for the Brochure folder. Since the starting condition for the Brochure folder which is the subsequent terminal folder is designated, the connection line 1003 is displayed in the valid state. The reference number 1004 indicates a connection line between the ending condition for the Brochure folder and the starting condition for the Cover Letter feeder. The Customer folder is designated as the repetition folder. Thus, among the terminal folders which are at the lower level of the repetition folder, the ending condition for the Brochure folder which is the last terminal folder is in connection with the starting condition for the Cover Letter folder which is the leading terminal folder. Since the starting condition for the Cover Letter folder which is the subsequent terminal folder is designated, the connection line 1004 is displayed in the valid state.

Figure 10B:
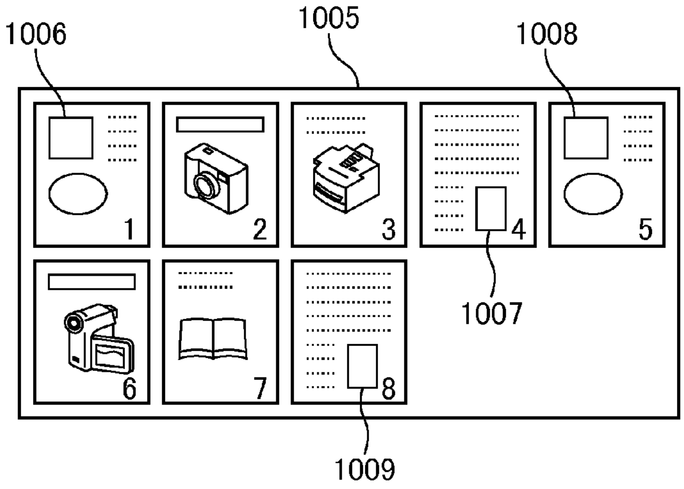
FIG. 10B is a diagram illustrating an example of a PDF file to be input.

FIG. 10B is a diagram, illustrating the thumbnail sketch of the content of a PDF file to be input. As shown in FIG. 10B, a PDF file 1005 is composed of eight pages. As described above, the object 1006 of the first page and the object 1008 of the fifth page are objects that have the same content and are rendered at the same position. Further, the object 1007 of the fourth page and the object 1009 of the eighth page are objects that have the same content and are rendered at the same position.

Figure 10C:
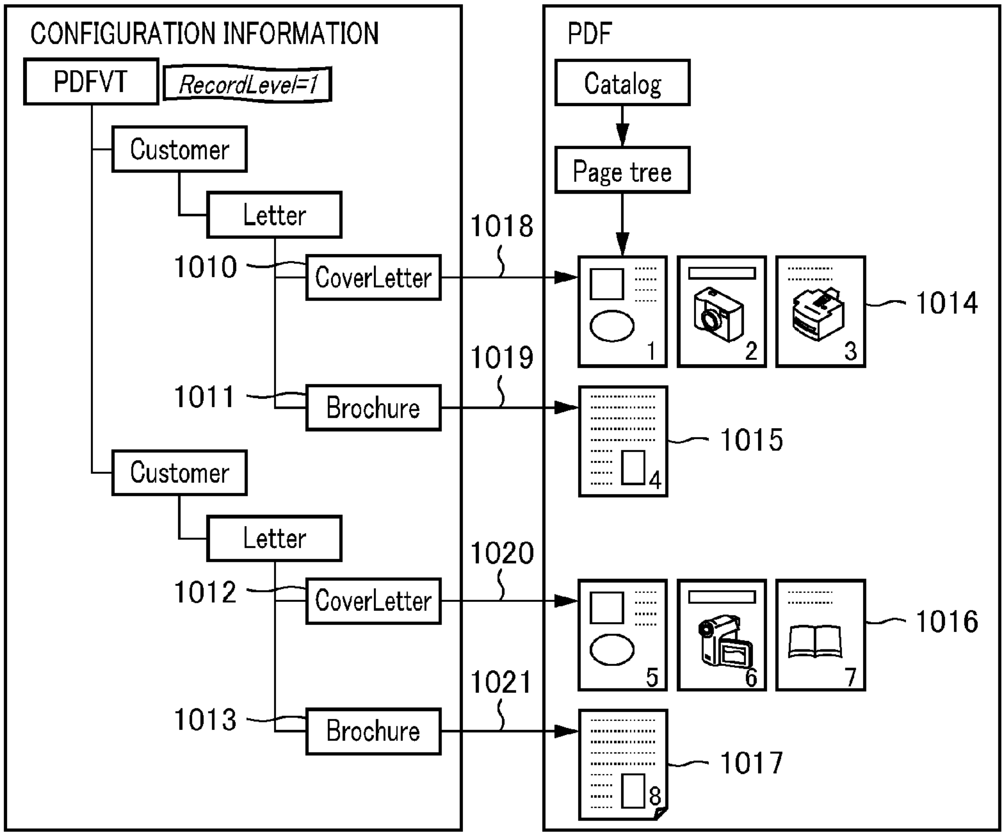
FIG. 10C is a diagram illustrating configuration information created by the present invention.

FIG. 10C is a schematic block diagram illustrating she logical structure of configuration information created as a result, of application of the rule created in FIG. 10A to the PDF file shown in FIG. 10B. The reference numbers 1010 to 1013 are nodes created in a similar manner to those shown in FIG. 9C. The reference numbers 1014 to 1017 are pages of the input PDF file 1005. Each of the reference numbers 1018 to 1021 indicates a link from a terminal node of configuration information to a page of a PDF file. As shown in FIG. 10A, the created rule has been designated that the page allocation to the Cover Letter folder is started if there is a page having the same content as that of the objects 1006 and 1008 at the same position. In accordance with the rule, a lint 1018 is created from a Cover Letter code 1010 to the first page having the object 1006. Also, the created rule has been designated that the page allocation to the Brochure folder is started if there is a page having the same content as that of the objects 1007 and 1009 at the same position. In accordance with the rule, a link 1019 is created from a Brochure folder 1011 to the fourth page having the object 1007. The same applies to links 1020 and 1021. A method for holding a link to a page (or pages) of a PDF file will be described, below with reference to FIG. 12 and FIG. 13.

<Metadata Setting>

Next, a description will be given of the state in which metadata is set to the configuration information 403 in step S511 with reference to FIG. 11. FIG. 11 is a block diagram illustrating an example in which metadata is set to configuration information shown in FIG. 9C.

In configuration information, any metadata can be set to any node. In the present embodiment, metadata represents a key and a value in the format of "Key=Value", Metadata 1121 "Name=Jane Doe" and metadata 1122 "Gender=Male" are set to a Customer folder 1104, and metadata 1123 "Name=Jane Doe" and metadata 1124 "Gender=Female" are set to a Customer folder 1108. Since a method for creating/changing/deleting metadata by receiving an input from a user is well-known in Property Setting or the like for Microsoft Windows (registered trademark), the detailed description thereof will not be provided.

<Internal Representation of Configuration Information>

Figure 12:
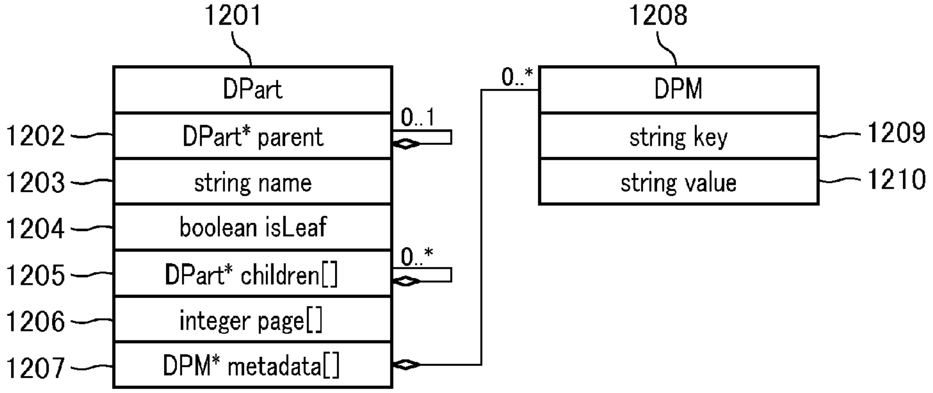
FIG. 12 is a diagram illustrating the data structure of configuration information.

Next, a description will be given of a data structure for use when the configuration information creating program 211 holds the configuration information 403 in the RAM 202 with reference so FIG. 12 and FIG. 13. FIG. 12 is a class diagram illustrating a data structure, which is represented using UML (Unified Modeling Language), for use when the configuration information creating program 211 holds the configuration information 403 in the RAM 202. In one embodiment of the present invention, virtual basic data types and grammatical structures as described below are used.

There sere three basic data types: boolean, integer, and string. Boolean is a true/false type and stores "true" or "false" as values. Integer is an integer type and stores any integer value as values. String is a character string type and stores a character "string" of any length as values. There are three types of grammatical structure: structure, pointer, and array. Structure and pointer are equivalent to those that can be used with C language. As an invalid, pointer value, "0" is used. Although array notation is also equivalent, to that that can be used with C language, there is no need to designate a data size upon declaration, and thus, a data size may be expanded or reduced as appropriate upon execution.

The reference number 1201 indicates a DPart structure for storing DPart node information. A parent 1202 is a pointer for storing a reference to the parent DPart node. A name 1203 is a character string for storing the name of the DPart node. An isLeaf 1204 is a boolean value for storing whether or not the DPart node is a terminal node. A child 1205 is an array of pointers for storing a reference to a child DPart node. A page 1206 is an array of integers for storing the PDF page number of the link destination. By the definition of the configuration information 403, when the value of the isLeaf 1204 is "true", the page 1206 as used and the child 1205 is not used. When the value of the isLeaf 1204 is "false", the child 1205 is used and the page 1206 is not used. A Metadata 1207 is am array of pointers for storing a reference to a DPM structure 1208. The reference number 1208 indicates a DPM structure for storing DPM metadata information. A key 1209 is a character string for storing the key of metadata. A value 1210 is a character string for storing the value of metadata.

In one embodiment of the present invention, virtual data types and grammatical structures described above are used, but the present invention is not limited thereto. Any data type and any grammatical structure may be used, as long as they are compatible with a language used for writing the configuration information creating program 211. In one embodiment of the present invention, the value of metadata is limited to character string, but the present invention is not limited thereto. Any data, type and any grammatical structure may be used as long as they are compatible with a language used, for writing the configuration information creating program 211.

Figure 11:
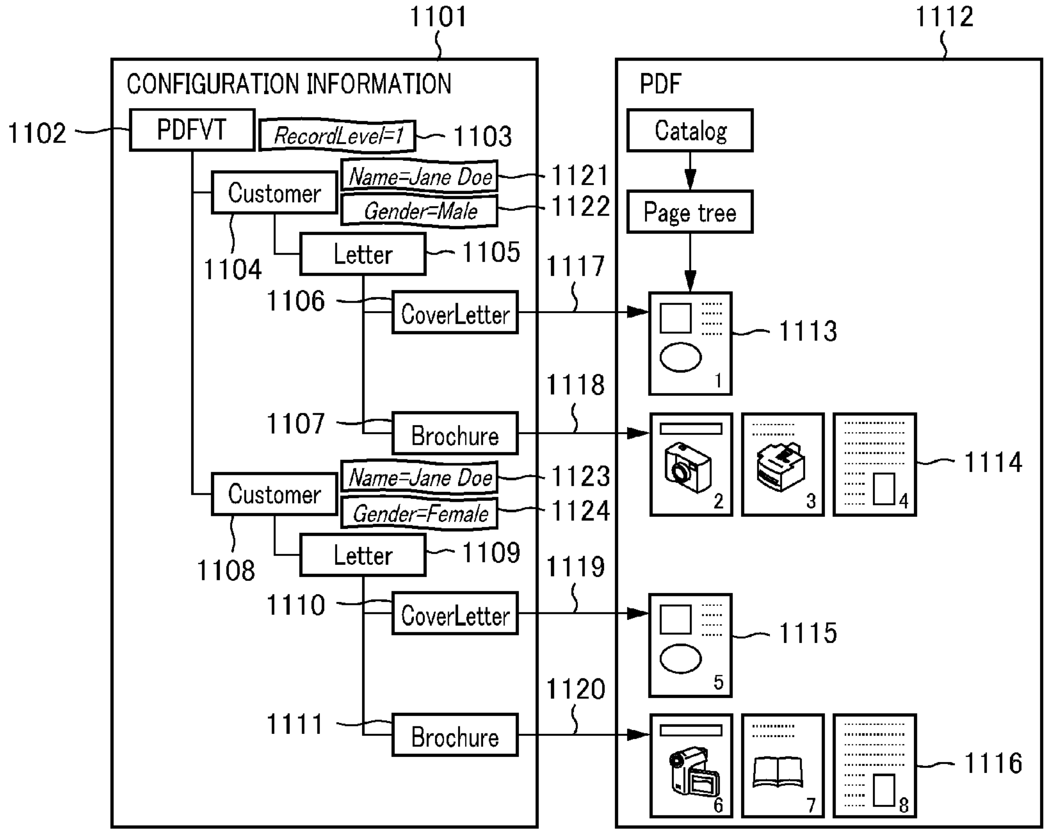
FIG. 11 is a diagram illustrating an example of configuration information in which metadata is set according to the present invention.
Figure 13:
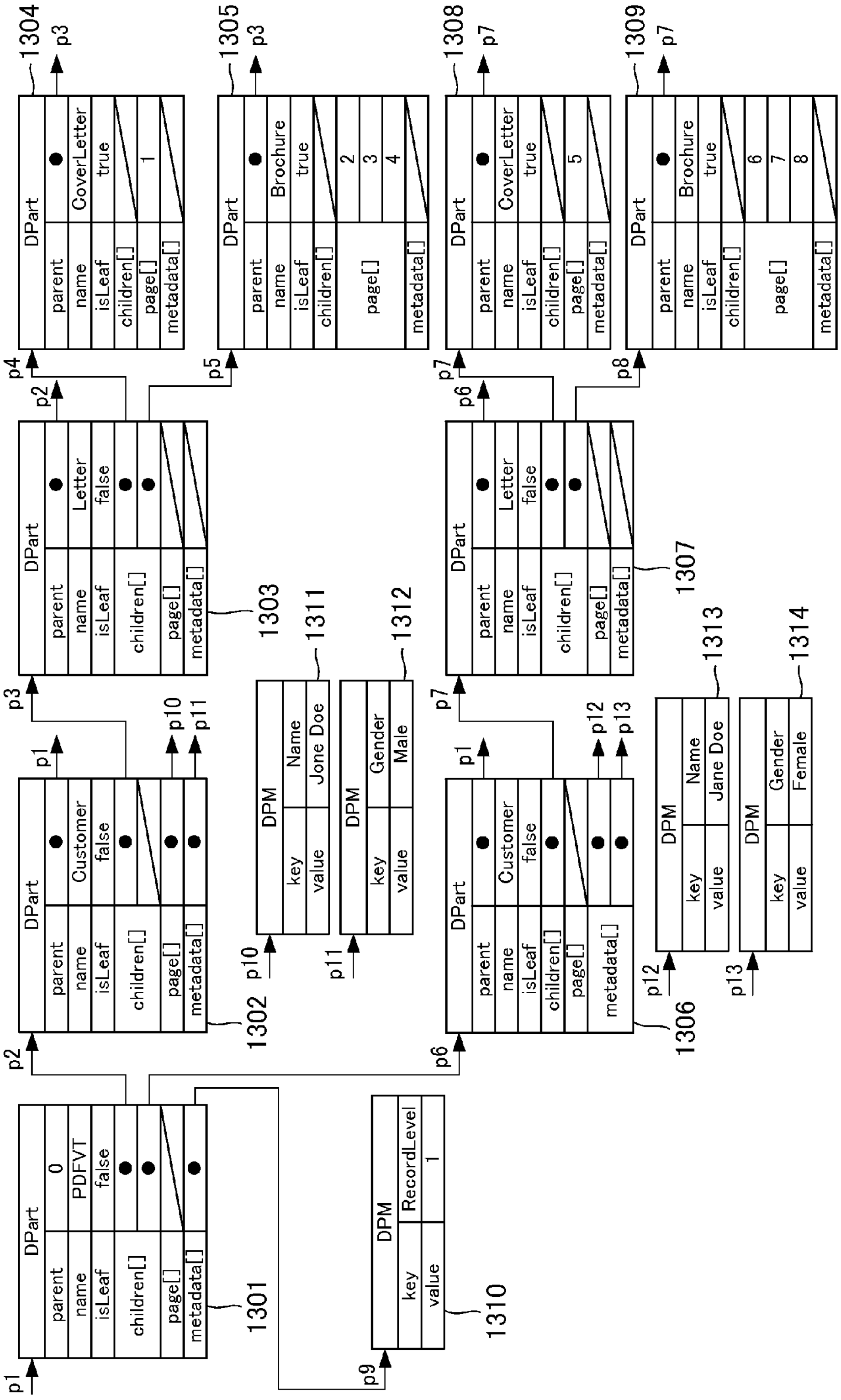
FIG. 13 is a diagram illustrating a sample of the data structure of configuration information.

FIG. 13 is an instance diagram illustrating the representation of configuration information 1101 shown in FIG. 11 using the data structure shown in FIG. 12.

An instance 1301 of the DPart structure 1201 corresponds to a node 1102. Since there is no parent node for the node 1102, the parent 1202 stores "0" as the invalid pointer value. The name 1203 stores "PDFVT" as the name of the node 1102. Since the node 1102 is not a terminal node, the isLeaf 1204 stores "false". Since the node 1102 has child nodes 1104 and 1108, the child 1205 stores a pointer (p2) to an instance 1302 and a pointer (p6) to an instance 1306, where the instances 1305 and 1506 correspond to the child nodes 1104 and 1108, respectively. The page 1206 is not used. Since the node 1102 has metadata 1103, the metadata 1207 stores a pointer (p5) to an instance 1310 which corresponds to the metadata 1103.

The instance 1302 of the DPart structure 1201 corresponds to the node 1104. Since the parent node of the node 1104 is the node 1102, the parent 1202 stores a pointer (p1) to the instance 1301 which corresponds to the node 1102. Since the node 1104 has metadata 1121 and 1122, the metadata 1207 stores a pointer (p10) to an instance 1311 and a pointer (p11) to an instance 1312, where the instances 1311 and 1315 correspond to the metadata 1121 and 1122, respectively.

An instance 1304 of the DPart structure 1201 corresponds to a node 1106. Since the node 1106 is a terminal node, the isLeaf 1204 stores "true". The child 1205 is not used. Since the node 1106 is linked to the first page 1113 of a PDF file 1112, the page 1206 stores "1" as the page number.

The instance 1310 of she DPM structure 1208 corresponds to the metadata 1103. Since the metadata 1103 is "RecordLevel=1", the key 1209 stores "RecordLevel" and the value 1210 stores "1". The same us described above applies to other instances 1303, 1305 to 1309, and 1311 to 1314.

<XML Representation of Configuration Information>

Next, a description will be given of a description method for use when the configuration information creating program 211 holds the configuration information 403 in the external storage device 204 with reference to FIG. 14. FIG. 14 is a diagram illustrating an exemplary description method for use when the configuration information creating program 211 holds configuration information, shown in FIG. 13 in the external storage device 204.

Here, the configuration information 403 is represented in XML (extensible Markup Language). This is done in accordance: with the representation method defined, in the Annex B "XML Representation of the document part hierarchy" of ISO 16612-42 Graphic technology—Variable data exchange—Part 2: Using PDF/X-4 and PDF/X-5 (PDF/VT-1 and PDF/VT-2). The components shown in FIG. 13 are in a one-to-one correspondence with those shown in FIG. 14, and the conversion from FIG. 13 to FIG. 14 is apparent, and thus, the detailed description will not be provided.

In the embodiment of the present invention, an XML representation method as described above is used, but the present invention is not limited thereto. Any representation method may be used as long as configuration information is representable.

<Rule Application Processing>

Next, a description will be given, of the details of processing for creating the configuration information 403 by the configuration information creating program 211 serving as a rule application unit in step S510 with reference to FIGS. 15A to 16C.

Figure 15A:
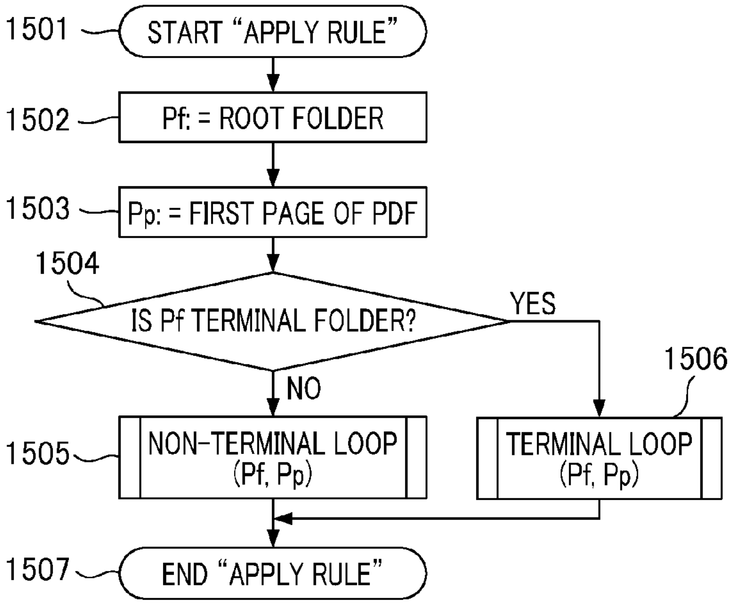
FIGS. 15A and 15B are flowcharts illustrating rule application processing.
Figure 16A:
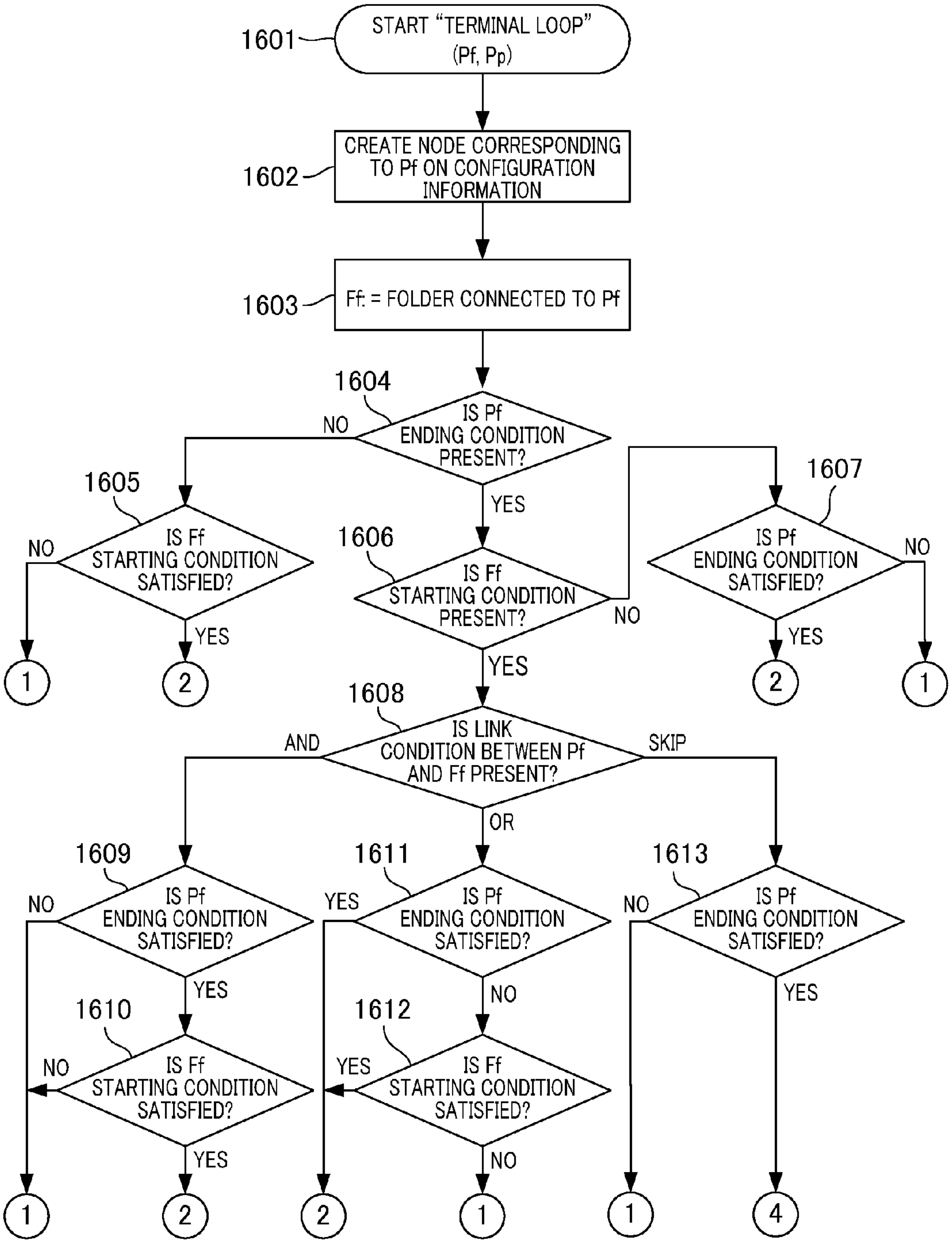
FIG. 16A is a flowchart illustrating processing for allocating a page or pages to a terminal folder.
Figure 16B:
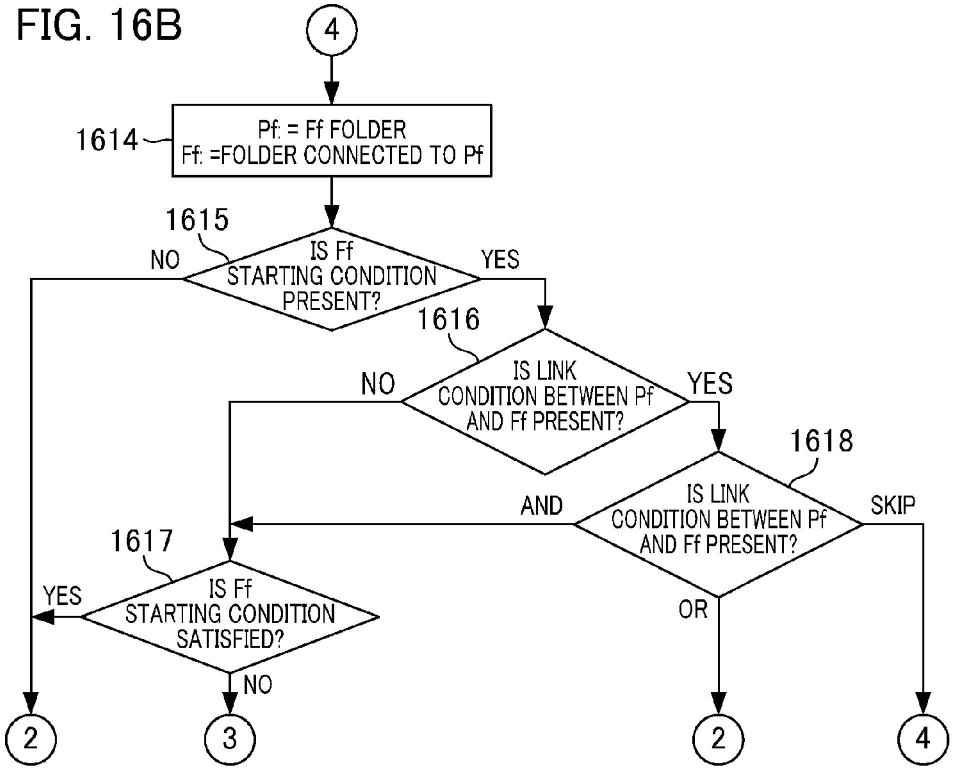
FIG. 16B is a flowchart illustrating processing for allocating a page or pages to a terminal folder.
Figure 16C:
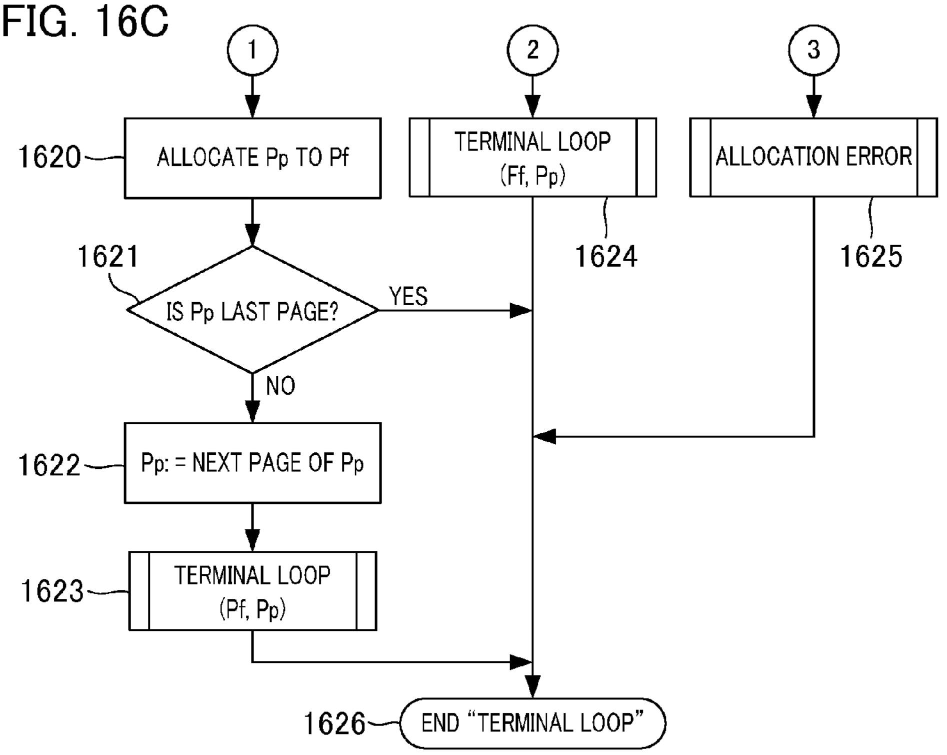
FIG. 16C is a flowchart illustrating processing for allocating a page or pages to a terminal folder.

FIG. 15A is a flowchart illustrating the details of processing performed when, the configuration information creating program 211 applies the rule created on the rule creation screen 601 to a PDF file.

In step S1501, the configuration information creating program 211 starts processing. In step S1502, the configuration information creating program 211 stores a pointer indicating the root folder among the folders created by the folder creation pane 602 on the rule creation screen 601 in a variable Pf. In step S1503, the configuration information creating program 211 stores a pointer indicating the first page of the PDF file to which the rule is applied in a variable Pp. In step S1504, the configuration information creating program 211 determines whether or not a folder indicated by Pf (hereinafter simply referred to as "Pf folder") is a terminal folder. When the Pf folder is not a terminal folder, the process advances to step S1505, whereas when the Pf folder is a terminal folder, the process advances to step S1506.

Figure 15B:
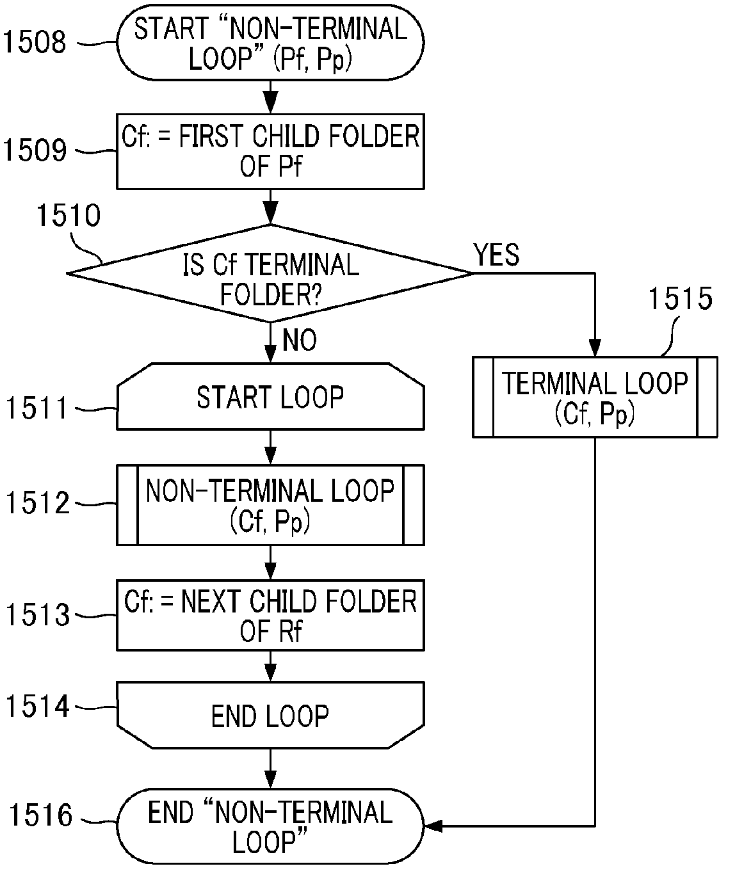

When the Pf folder is not a terminal folder, in step S1505, the configuration information creating program 211 calls "non-terminal loop" processing starting from step S1508 in FIG. 15B using Pf and Pp as arguments. When the Pf folder is a terminal folder, in step S1506, the configuration information creating program 211 calls "terminal loop" processing starting from step S1601 shown in FIG. 16A using Pf and Pp as arguments. In step S1507, the configuration information creating program 211 ends processing.

FIG. 15B is a flowchart illustrating the details of "non-terminal loop" processing performed, by the configuration information creating program 211.

In step S1508, the configuration information creating program 211 starts "non-terminal loop" processing. The argument Pf represents a rule folder to be processed and the argument. Pp represents a page of a PDF file to be processed. In step S1509, the configuration information creating program 211 stores a pointer indicating the first child folder among the Pf folders in a variable Cf. Since the Pf folder is a non-terminal folder, at least, one child folder is present. In step S1510, the configuration information creating program 211 determines whether or not a folder indicated by Cf (hereinafter simply referred to as "Cf folder") is a terminal folder. When the Cf folder is not a terminal folder, the process advances to step S1511, whereas when the Cf folder is a terminal folder, the process advances to step S1515.

When the Cf folder is not a terminal folder, in step S1511, the configuration information creating program 211 starts loop processing for child folders of the Pf folder. In step S1512, the configuration information creating program 211 calls "non-terminal loop" processing starting from step S1508 using Cf and Pp as arguments. In step S1513, the configuration information creating program 211 stores the next child folder of the Cf folder among the child folders of the Pf folder in a variable Cf. In step S1514, loop processing starting from step S1511 is ended. In other words, if there is still a child, folder of the Pf folder, the configuration information, creating program 211 returns to step S1511 and repeats processing. When the configuration information creating program 211 completes processing for all the child folders of the Pf folder, the process advances to step S1515.

When the Cf folder is a terminal folder, in step S1515, the configuration information creating program 211 calls "terminal loop" processing starting from step S1601 shown in FIG. 16A using Cf and Pp as arguments. In step S1516, the configuration information creating program 211 ends "non-terminal loop" processing.

FIGS. 16A to 16C are flowcharts illustrating the details of processing for allocating a page (or pages) of a PDF file to a terminal folder when the configuration information creating program 211 applies the rule created on the rule creation screen 601 to the PDF file.

In step S1601, the configuration information creatine program 211 starts processing. The argument Pf represents a rule folder to be processed and the argument Pp represents a PDF file to be processed. In step S1602, the configuration information creating program 211 creates a node corresponding to the Pf folder in the configuration information 403. When a node corresponding to an ancestor folder of the Pf folder is not present in the configuration information 403, the configuration information creating program 211 also creates the node.

In step S1603, the configuration information creating program 211 searches the starting condition connected to the ending condition for the Pf folder on the starting condition designation pane 607 and the ending condition designation pane 609 of the rule creation screen 601. Then, the configuration information creating program 211 stores a pointer indicating a folder corresponding to the starting condition in a variable Ff.

In step S1604, the configuration information creating program 211 determines whether or not the ending condition is set to the Pf folder. When the ending condition is not set to the Pf folder, the process advances to step S1605. When the ending condition is set to the Pf folder, the process advances to step S1606.

When the ending condition is not set to the Pf folder, in step S1605, the configuration information creating program 211 determines whether or not the starting-condition for the Ff folder is satisfied. As described above, when all connection lines defined by a rule are in the valid state, the rule is applicable to a PDF file. Thus, when the ending condition is not set to the Pf folder, the starting condition should be set to a folder indicated by Ff (hereinafter simply referred to as "Ff folder"). When the starting condition for the Ff folder is not satisfied, allocation processing for the Pf folder continues. In this case, the process advances to step S1620, and the configuration information creating program 211 performs processing for allocating a PDF file page indicated by Pp (hereinafter simply referred to as "Pp page") to the Pf folder. When the starting condition for the Ff folder is satisfied, allocation processing for the Pf folder ends. In this case, the process advances to step S1624, and the configuration information creating program 211 starts allocation processing for the Ff folder.

When the ending condition is set to the Ff folder, in step S1606, the configuration information creating program 211 determines whether or not the starting condition is set to the Ff folder. When the starting condition is not set to the Ff folder, the process advances to step S1607. When the ending condition is set to the Ff folder, the process advances to step S1608.

When the ending condition is set to the Pf folder and the ending condition is not set to the Ff folder, in step S1607, the configuration information creating program 211 determines whether or not the ending condition for the Pf folder is satisfied. When the ending condition for the Pf folder is not satisfied, allocation processing for the Pf folder continues. In this case, the process advances to step S1620, and the configuration information creating program 211 performs processing for allocating the Pp page to the Pf folder. When the ending condition for the Pf folder is satisfied, allocation processing for the Pf folder ends. In this case, the process advances to step S1624, and the configuration information creating program 211 starts allocation processing for the Ff folder.

When the ending condition is set to the Pf folder and the starting condition is set to the Ff folder, the configuration information creating program 211 determines the link condition set to both terminal folders in step S1608. As described above, if the condition of both terminal folders is set the configuration information creating program 211 should display a link condition designation popup menu 808 and thus causes a user to select the operation of the connection line. When the link condition is "AND", the process advances to step S1609. When the link condition is "OR", the process advances to step S1611. When the link condition is "SKIP", the process advances to step S1613.

The processes in step S1609 and step S1610 are performed when the link condition between the Pf folder and the Ff folder is "AND". As described above, if the condition of both terminal folders is satisfied, the configuration information creating program 211 starts allocation processing for the Ff folder. Thus, the configuration information creating program 211 determines in step S1609 whether or not the ending condition for the Pf folder is satisfied, and determines in step S1610 whether or not the starting condition for the Ff folder is satisfied. When any one of the conditions is not satisfied, the process advances to step S1620, and the configuration information creating program 211 performs processing for allocating the Pp page to the Pf folder. When both conditions are satisfied, the process advances to step S1624, and the configuration information creating program 211 starts allocation processing for the Ff folder.

The processes in step S1611 and step S1612 are performed when the link condition between the Pf folder and the Ff folder is "OR". As described above, if the condition of any one of terminal folders is satisfied, she configuration information creating program 211 starts allocation processing for the Ff folder. Thus, the configuration information creating program 211 determines in step S1611 whether or not the ending condition for the Pf folder is satisfied and determines in step S1612 whether or not the starting condition for the Ff folder is satisfied. When both conditions are not satisfied, the process advances to step S1620, and the configuration information creating program 211 performs processing for allocating the Pp page to the Pf folder. When any one of the conditions is satisfied, the process advances to step S1524, and the configuration information creating program 211 starts allocation processing for the Ff folder.

The process in step S1613 is performed when the link condition between the Pf folder and the Ff folder is "SKIP". As described above, if the ending condition for the Pf folder is satisfied, the configuration information creating program 211 skips allocation processing for the Ff folder. Thus, in step S1613, the configuration information creating program 211 determines whether or not the ending condition for the Pf folder is satisfied. When the ending condition for the Pf folder is not satisfied, the process advances to step S1620, and the configuration information creating program 211 performs processing for allocating the Pp page to the Pf folder. When the ending condition for the Pf folder is satisfied, the process advances to step S1614, and the configuration information creating program 211 performs skip processing for the Ff folder.

The process advances to the flowchart shown in FIG. 16B. The process in step S1614 is performed when the link, condition between the Pf folder and the Ff folder is "SKIP", the ending condition for the Pf folder is satisfied, and skip processing for the Ff folder is performed. Firstly, the configuration information creating program 211 stores a pointer indicating the current Ff forcer in a variable Pf. Then, the configuration information creating program 211 searches a starting condition connected to the ending condition for the Pf folder on the starting condition designation pane 607 and the ending condition, designation pane 600 of the rule creation screen 601, and stores a pointer indicating a folder corresponding to the starting condition in a variable Ff.

In step S1615, the configuration information creating program 211 determines whether or not the starting condition is set to the Ff folder. When the starting condition is not set to the Ff folder, the process advances to step S1624, and the configuration information creating program 211 starts allocation processing for the Ff folder. When the starting condition is set to the Ff folder, the process advances to step S1616.

In step S1616, the configuration information creating program 211 determines whether or not the link condition between the Pf folder to be skipped and the Ff folder to which allocation is going to be performed is set. When the link condition is not set, the process advances to step S1617. When the link condition is set, the process advances to step S1613.

The process in step S1617 is performed when the starting condition is set to the Ff folder and the link condition between the Pf folder and the Ff folder is not set. The configuration information creating program 211 determines whether or not the starting condition for the Ff folder is satisfied. When the starting condition for the Ff folder is satisfied, the process advances to step S1624, and the configuration information creating program 211 starts allocation processing for the Ff folder. When the starting condition for the Ff folder is not satisfied, the rule created on the rule creation screen 601 does not match the PDF file in the middle of application. Thus, the process advances to step S1625, and the configuration information creating program 211 performs allocation error processing.

In step S1618, when the link condition between the Pf folder and the Ff folder is set, the configuration information creating program 211 determines the link condition. Here, it is assumed that the ending condition for the Pf folder to be skipped is satisfied. When the link condition is "AND", the process advances to step S1617 so as to only determine whether or not the starting condition for the Ff folder as satisfied. When the link condition is "OR", the process advances to step S1624, and the configuration information creating program 211 starts allocation processing for the Ff folder. When the link condition is "SKIP", the process advances to step S1614, and the configuration information creating program 211 performs skip processing for the Ff folder.

The process advances to the flowchart shown in FIG. 16C. In step S1620, the configuration information creating program 211 allocates the Pp page to the Pf folder. In step S1621, the configuration information creating program 211 determines whether or not the Pp page is the last, page of the PDF file. When the Pp page is not the last page, the process advances to step S1622, and the configuration information creating program 211 continues allocation processing. When the Pp page is the last page, the process advances to step S1626, and the configuration information creating program 211 ends allocation processing. In order to perform allocation processing for the next, page in step S1622, the configuration, information creating program 211 stores a pointer indicating the next page of the Pp page in a variable Pp. In step S1623, the configuration information creating program 211 calls "terminal loop" processing starting from step S1601, and performs processing for allocating the Pp page to the Pf folder. In step S1623, the configuration information creating program 211 calls "terminal loop" processing starting from step S1601, and performs processing for allocating the Pp page to the Ff folder. On the other hand, in step S1625, the configuration information creating program 211 performs error processing when an allocation error is found. In step S1625, the configuration information creating program 211 ends processing.

<Example of Rule Application Processing>

Next, a description will be given by taking an example of how the configuration information 906 described in FIG. 9C is created from the rule described in FIG. 9A and the PDF file described in FIG. 9B using the flowcharts described in FIG. 15A to FIG. 16C.

In step S1502, the Pf folder becomes the Customer folder. In step S1503, the Pp page becomes the first page. In step S1504, the Customer folder is not a terminal folder, and thus, the configuration information creating program 211 calls step S1508 from step S1505. In step S1509, the Cf folder becomes the better folder. In step S1510, the letter folder is not a terminal folder, and thus, the configuration information creating program 211 calls step S1508 from, step S1512.

In step S1509, the Cf folder becomes the Cover Letter folder. In step S1510, the Cover Letter folder is a terminal folder, and thus, the configuration information creating program 211 calls step S1601 from step S1515. In step S1601, the Pf folder becomes the Cover Letter folder and the Pp page becomes the first page.

In step S1602, the configuration information creating program 211 creates the Cover Letter node 911 corresponding to the Ff folder in the configuration information 906. At this time, no parent node rues been created, and thus, the configuration information creating program 211 simultaneously creates the PDFVT node 907, the Customer node 909, and the Letter node 910. Since the first level, is designated as the record level, on the rule creation screen shown in FIG. 9A, the configuration information creating program 211 creates the metadata 908 of "RecordLevel=1" upon creation of the PDFVT node 907.

In step S1603, the Ff folder becomes the Brochure folder. Since the ending condition is set to the Pf folder but the starting condition is not set to the Ff folder, the process advances to step S1607. In step S1607, the configuration information creating program 211 has not yet performed processing for allocating a PDF page(s) to the Pf folder. Thus, the ending condition for the Pf folder is not satisfied, and the process advances to step S1620.

In step S1620, the configuration information creating program 211 allocates the first page 918, i.e., the Pp page to the Cover Letter node 911 corresponding to the Pf folder to thereby create a link 922. In steps S1621 and S1622, the Pp page becomes the second page, and the configuration information creating program 211 calls step S1601 from step S1623.

In step S1601, the Pf folder becomes the Cover Letter folder and the Pp page becomes the second page. At this time, the Cover Letter node 911 corresponding to the Pf folder has already been created, and thus, nothing is conducted in step S1602. In step S1603, the Ff folder becomes the Brochure folder. Since the ending condition is set to the Pf folder and the starting condition is not set to the Ff folder, the process advances to step S1607. In step S1507, one PDF page has already been allocated to the Ff folder. Thus, the ending condition for the Pf folder is satisfied, and the configuration information creating program 211 calls step S1601 from step S1623.

In step S1601, the Pf folder becomes the Brochure folder and the Pp page becomes the second page. In step S1602, the configuration information creating program 211 creates the Brochure node 912 corresponding to the Pf folder on the configuration information 906. In step S1603, the Ff folder becomes the Cover Letter folder. Since she ending condition is set to the Ff folder and the starting condition is not set to the Ff folder, the process advances to step S1607.

In step S1607, the configuration information creating program 211 has not yet performed processing for allocating a PDF page(s) to the Pf folder. Thus, the ending condition for the Pf folder is not satisfied, and the process advances to step S1620. In step S1650, the configuration information creating program 211 allocates the second page (the first page of 910), i.e., the Pp page to the Brochure node 912 corresponding to the Pf folder to thereby create a link 923.

In steps S1621 and S1622, the Pp page becomes the third page, the configuration information creating program 211 calls step S1601 from step S1623. In step S1601, the Pf folder becomes the Brochure folder and the Pp page is the third page. At this time, the Brochure node 912 corresponding to the Pf folder has already been created, and thus, nothing is conducted in step S1602. In step S1603, the Pf folder becomes the Cover Letter folder. Since the ending condition is set to the Pf folder and the starting condition is not set to the Ff folder, the process advances to step S1607.

In step S1607, the configuration information creating program 211 has performed processing for allocating only one PDF page to the Pf folder. Thus, the ending condition for the Pf folder is not satisfied, and the process advances to step S1620. In step S1620, the configuration, information creating program 211 allocates the third page (the second page of 919), i.e., the Pp page to the Brochure node 912 corresponding to the Pf folder.

In steps S1621 and S1622, the Pp page becomes the fourth page, and the configuration information creating program 211 calls step S1601 from step S1623. The processes in steps S1602, S1603, S1604, and S1606 and the same as those performed when the Pp page is the third page. In step S1607, three pages have already been allocated to the Pf folder. Thus, the ending condition for the Pf folder is satisfied, and the configuration information creating program 211 calls step S1601 from step S1623.

In step S1601, the Pf folder becomes the Cover Letter folder and the Pp page becomes the fifth page. In step S1602, the configuration information creating program 211 creates the Cover Letter node 915 corresponding to the Pf folder on the configuration information 906. At this time, no parent node has been created, and thus, the configuration information creating program 211 simultaneously creates a Customer node 913 said a Letter node 914. The processes in steps S1603, S1604, and S1607 are the same as those performed when the Pp page is the first page.

In step S1620, the configuration information creating program 211 allocates a fifth page 920, i.e., the Pp page to the Cover Letter node 915 corresponding to the Pf folder to thereby create a link 924. In steps S1621 and S1622, the Pp page becomes the sixth page, and the configuration information creating program 211 calls step S1601 from step S1623.

In step S1601, the Pf folder becomes the Cover Letter folder and the Pp page becomes the sixth page. The processes in steps S1602, S1603, S1504, and S1606 and the same as those performed when the Pp page is the second page.

In step S1607, one PDF page has already been allocated to the Pf folder. Thus, the ending condition for the Pf folder is satisfied, and the configuration information creating program 211 calls step S1601 from step S1623.

In step S1601, the Pf folder becomes the Brochure folder and the Pp page becomes the sixth page. In step S1602, the configuration information creating program 211 creates the Brochure node 916 corresponding to the Pf folder in the configuration information 906. The processes in step S1603, S1604, S1606, and S1607 are the same as those performed when the Pp page is the second page.

In step S1620, the configuration information creating program 211 allocates the sixth page (the first page of 921), i.e., the Pp page to the Brochure node 916 corresponding to the Pf folder to thereby create a link 925. The seventh page and the eighth page are created in the same manner as the third page and the fourth page. Finally, in step S1621, the configuration information creating program 211 determines that the Pp page is the last page when the Pp page is the eighth page. Then, the process advances to step S1626, and the configuration information creating program 211 ends processing.

<Print Information Setting>

Figure 17:
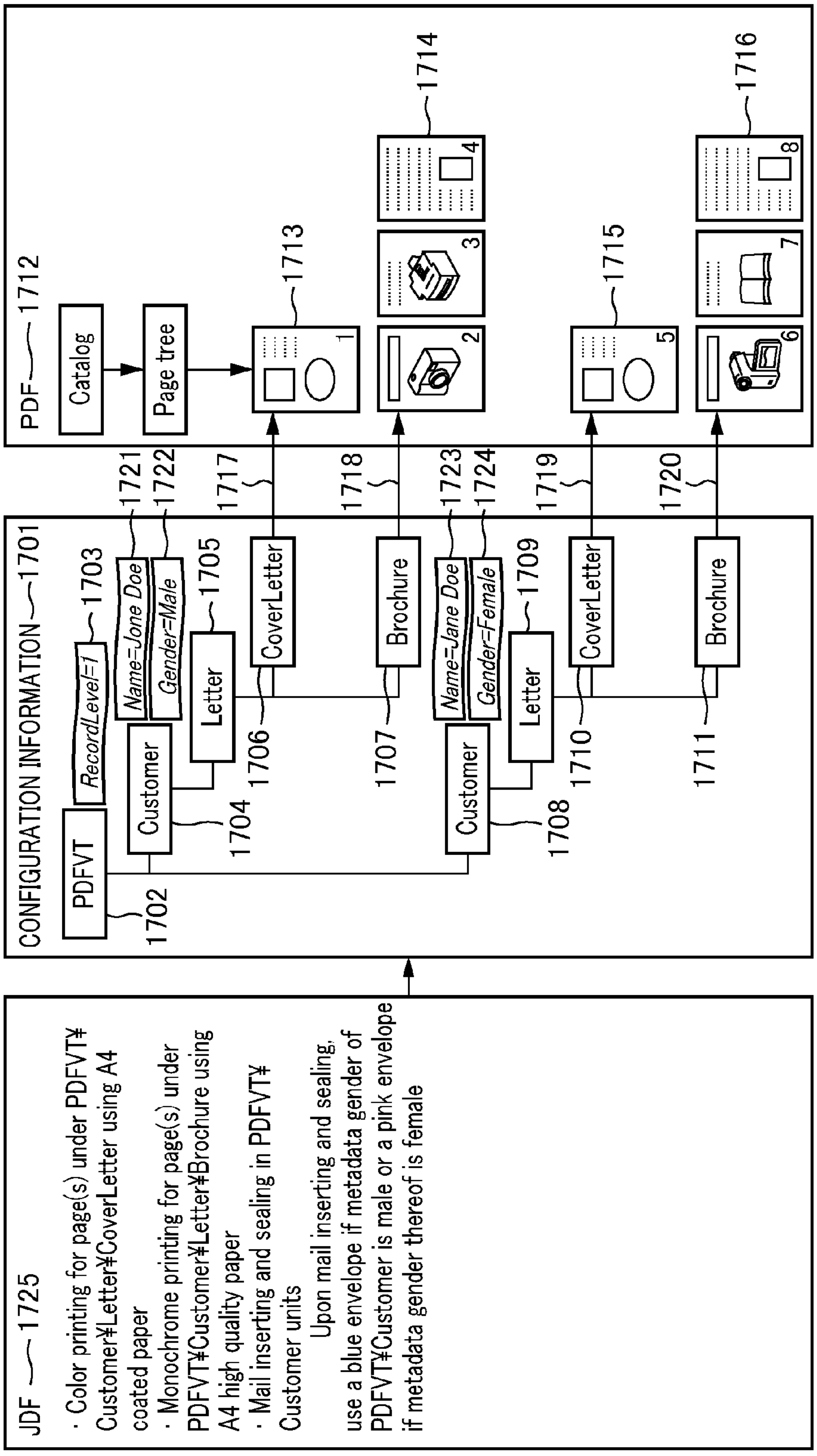
FIG. 17 is a diagram illustrating print information in which a print setting has been added to configuration information.

Next, a description will be given of the state in which a print, setting 404 which refers to the configuration information 403 in step S515 is added to the print information 401 by the print setting program 213 with reference to FIG. 17 and FIG. 18. FIG. 17 is a block diagram illustrating an example of print information in which a print setting has been added to configuration information shown in FIG. 11.

In one embodiment of the present invention JDF (file format for describing workflow process) is used as a job ticket format of a print setting. However, the description scheme for JDF is complicated and the description scheme is well-known. Thus, the print setting content is represented by a natural language in FIG. 11 in order to avoid complexity of description.

In a JDF 1725, a print setting "color printing for page(s) under PDFVT¥Customer¥Letter¥Cover Letter using A4 coated paper" has been made. Thus, a gage 1713 linked to a Cover Letter node 1706 and a page 1715 linked to a Cover Letter node 1710 are printed, in color using A4 coated paper.

In the JDF 1725, a print setting "monochrome printing for page(s) under PDFVT¥Customer¥Letter¥Brochure using 54 high quality paper" has been made. Thus, a page 1714 linked to a Brochure node 1707 and a page 1716 linked to a Brochure node 1711 are printed in monochrome using A4 high quality paper.

In the JDF 1725, a print setting "mail inserting and sealing in PDFVT¥Customer units" has been made. Thus, the pages 1713 and 1714 linked to a lower node of a Customer node 1704 and the pages 1715 and 1716 linked to a lower node of a Customer node 1708 are separately mail inserted and sealed.

In the JDF 1725, a print setting "upon mail inserting and sealing, use a blue envelope if metadata Gender of PDFVT¥Customer is Male or a pink envelope if metadata Gender thereof is Female" has been made. Thus, a blue envelope is used for the pages 1713 and 1714 linked to a lower node of the Customer node 1704 and a pink envelope is used for the page 1715 and 1716 linked to a lower node of the Customer node 1708.

Figure 18:
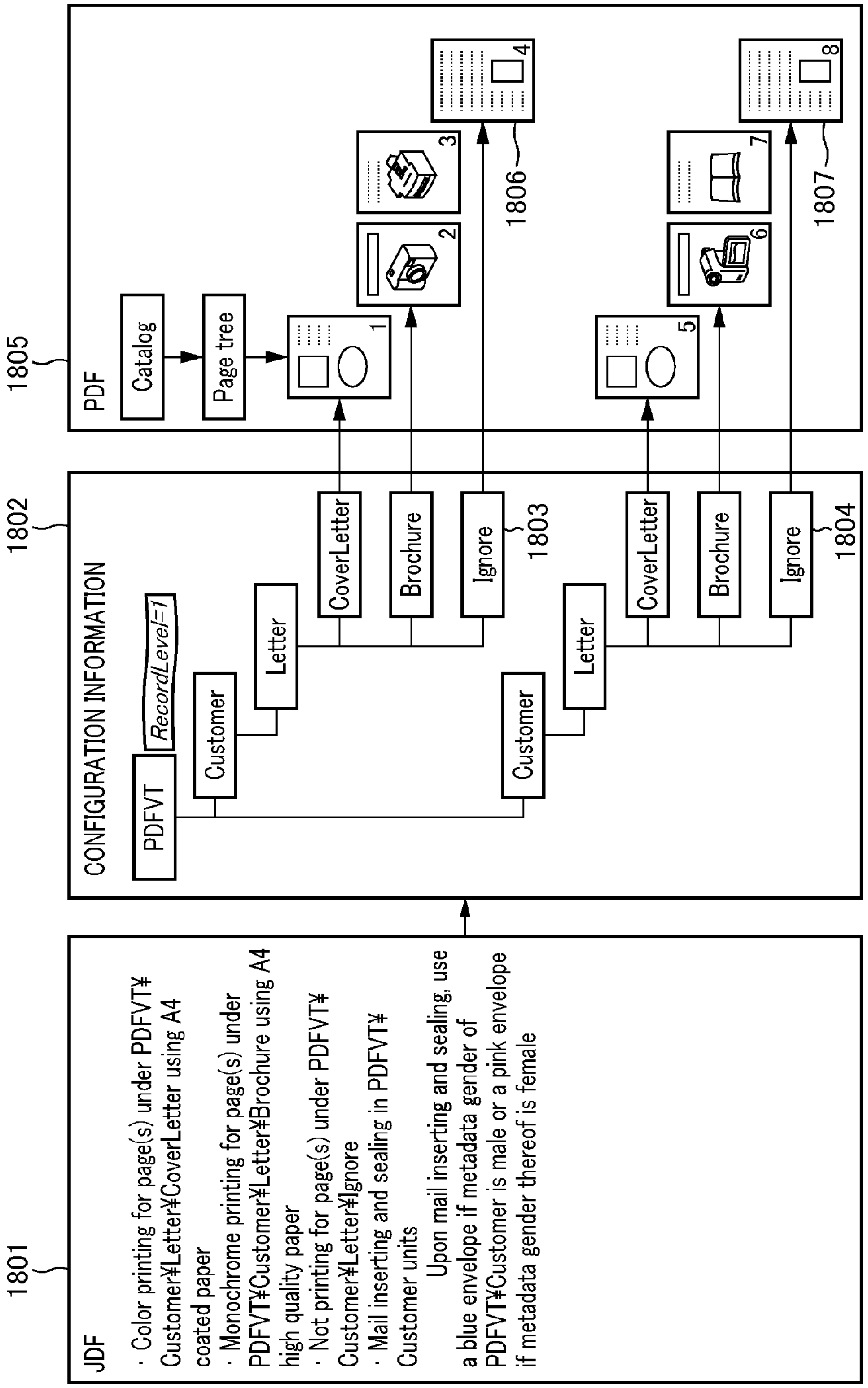
FIG. 18 is a diagram illustrating an example in which, unnecessary pages are not printed.

FIG. 18 is a block diagram illustrating an example in which a print setting has been added to another configuration information by the print setting program 213.

In configuration information 1802, Ignore nodes 1803 and 1804 are added, and a fourth page 1806 and an eighth page 1807 of a PDF file 1805 are linked to the Ignore nodes 1803 and 1804, respectively. In a PDF 1801, a print setting "no-printing for page(s) under PDFVT¥Customer¥Letter¥Ignore" has been made. Thus, the page 1806 linked, to the Ignore node 1803 and the page 1807 linked to the Ignore node 1804 are not printed.

As described above, according to the present embodiment, the print information 401 describing the print setting 404 can be created by referring to nodes and metadata of the configuration information 403 without dependence on the individual pages of the PDF file 402. A method for creating a print setting by receiving an input from a user is well-known, and thus, the detailed description thereof will not be provided.

<PDF/VT Conversion Processings>

Figure 19A:
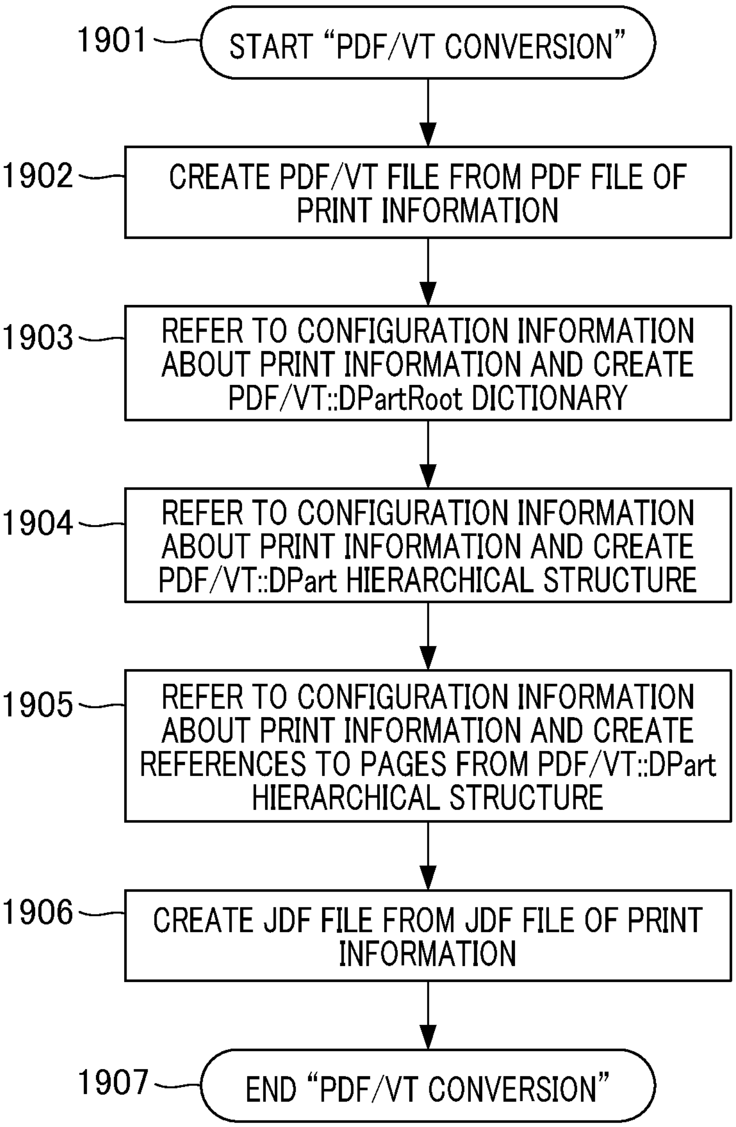
FIG. 19A is a flowchart illustrating processing for converting print information into PDF/VT.
Figure 19B:
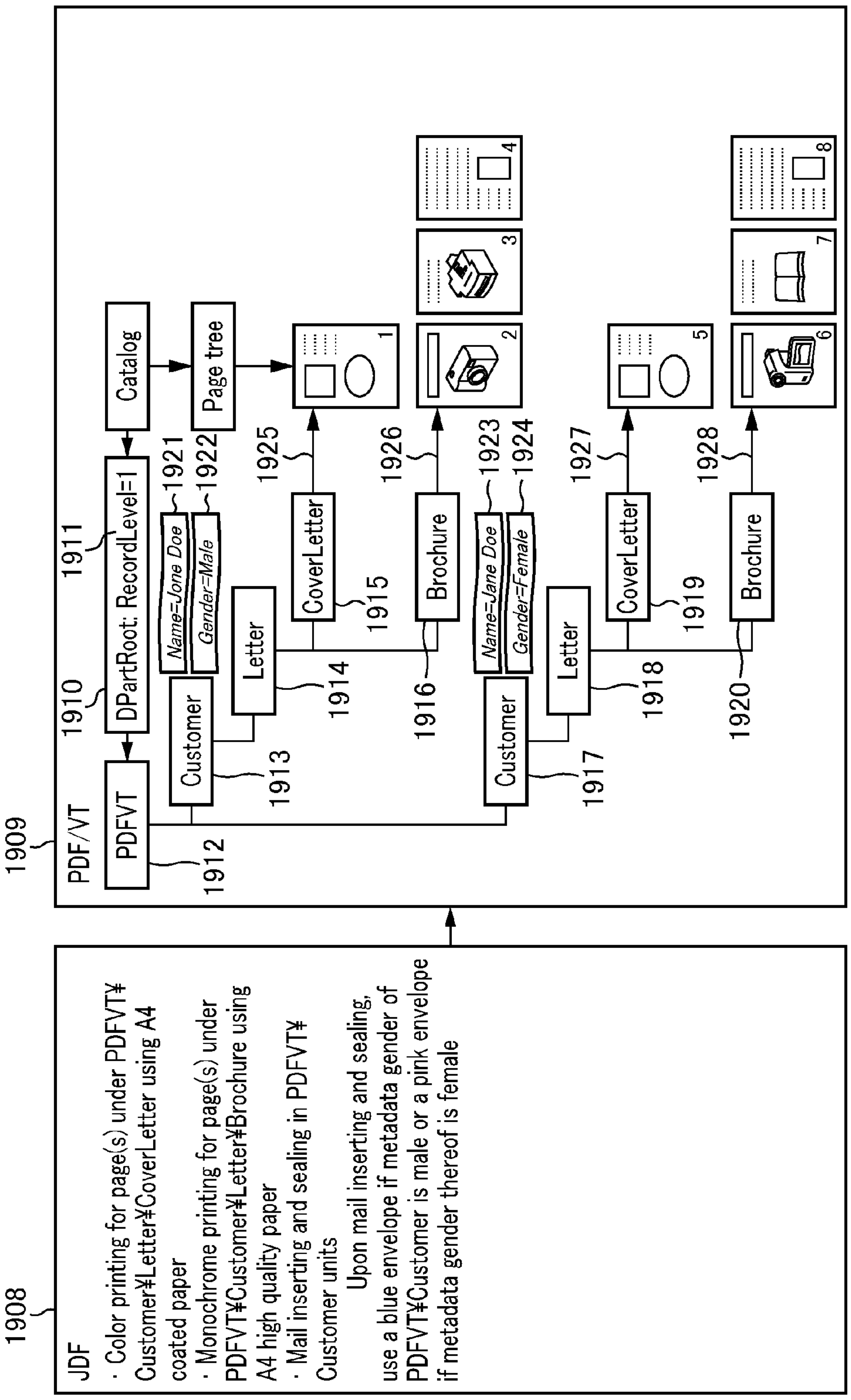
FIG. 19B is a diagram illustrating a PDF/VT file converted from print information.

Next, a description will be given of the details of processing for converting print information into a PDF/VT file and a JDF file in step S518 with reference to FIGS. 19A and 19B. FIG. 10A is a flowchart illustrating the details of processing for converting the print information 401 into a PDF/VT file and a JDF file by the configuration information creating program 211. FIG. 19B is a block diagram illustrating a PDF/VT file and a PDF file converted from print information shown in FIG. 17.

In step S1901, the configuration information creating program 211 starts processing. In step S1902, the configuration information creating program 211 creates a template of a PDF/VT file from the PDF file 402 of the print information 401. In the example shown in FIG. 19B, a PDF/VT file 1909 including Catalog dictionaries. Page Trees, and Page objects is created using a PDF file 1712.

In step S1903, the configuration information creating program 211 creates the DPartRoot dictionary 505 in the PDF/VT file created in step S1902. At this time, the configuration information creating program 211 refers to RecordLevel metadata added to the root node of the configuration information 403 to thereby set the RecordLevel property of the DPartRoot dictionary 305. In the example shown in FIG. 19B, a DPartRoot dictionary 1910 is created. At this time, the value is set to RecordLevel metadata 1703 added to a root node 1702 of configuration information 1701. With reference to this setting, the RecordLevel property 1911 of the DPartRoot dictionary 1910 is created, and the value of the RecordLevel property 1911 is set to "1".

In step S1904, the configuration information creating program 211 refers to the configuration information 403, and creates a DPart hierarchical structure on the PDF/VT file updated, in step S1903. In the example shown in FIG. 19B, the configuration information creating program 211 creates a DPart 1912 from the PDFVT node 1702. Likewise, DParts 1913 and 1917 are created from the Customer nodes 1704 and 1708, respectively. Likewise, DParts 1914 and 1913 are created from Letter nodes 1705 and 1709, respectively. Likewise, DParts 1915 and 1919 are created from the Cover Letter nodes 1706 and 1710, respectively. Likewise, DParts 1916 and 1920 are created from the Brochure nodes 1707 and 1711, respectively. Likewise, DPMs 1921 and 1922 are created from metadata 1721 and 1722, respectively. Likewise, DPMs 1923 and 1924 are created from metadata 1723 and 1724, respectively.

In step S1905, the configuration information creating program 211 refers to the configuration information 403, creates the references to the Page objects created in step S1902 from the DPart hierarchical structure of the PDF/VT file updated in step S1904. As described above, since the terminal node of the configuration information 403 holds the page number of the PDF file 402, the conversion is made such that the DPart terminal node of PDF/VT holds the reference to the Page object. In the example shown in FIG. 19B, the reference 1925 to a Page object is created from a link 1717. Likewise, the references 1926, 1927, and 1923 to the Page objects are created from links 1718, 1719, and 1720, respectively.

In step S1906, the configuration information creating program 211 creates a JDF file, which refers to the PDF/VT file created in steps S1902 to S1906, from the JDF file 404 of the print information 401. In the example shown in FIG. 19B, a JDF file 1908 is created from a JDF file 1715. Both JDF files have the same print setting content. In step S1907, the configuration information creating program 211 ends processing.

<PDF Conversion Processing>

Figure 20A:
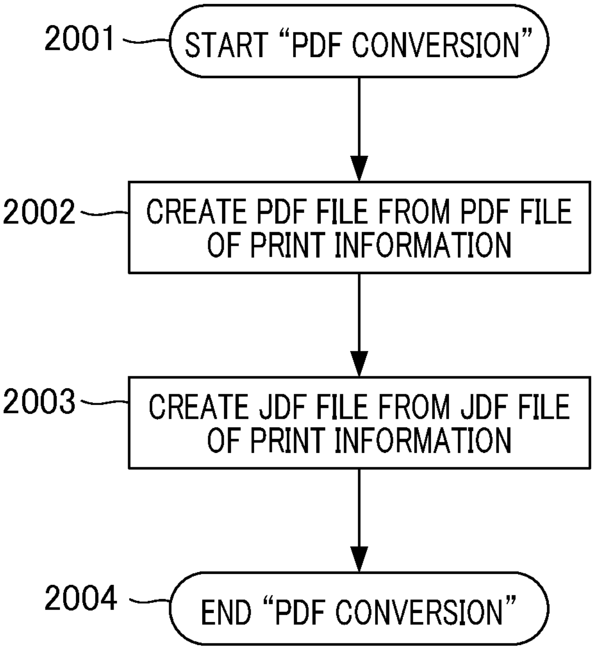
FIG. 20A is a flowchart illustrating processing for converting print information into PDF.
Figure 20B:
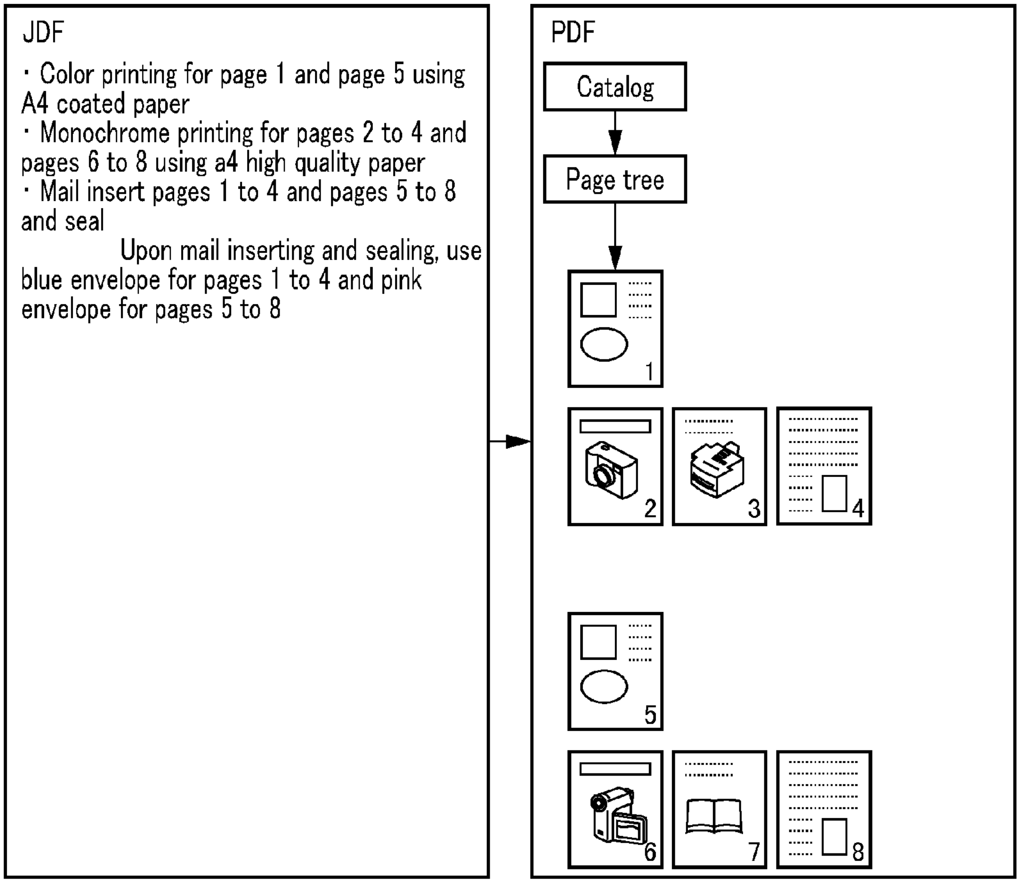
FIG. 20B is a diagram illustrating a PDF file converted from print information.

Next, a description will be given of the details of processing for converting print information into a PDF file and a JDF file in step S520 with reference to FIGS. 20A and 20B. FIG. 20A is a flowchart illustrating the derails of processing for converting the print information 401 into a PDF file and a JDF file by the configuration information creating program 211. FIG. 20B is a block diagram illustrating a PDF file and a JDF file converted from print information shown in FIG. 17.

In step S2001, the configuration information creating program 211 starts processing. In step S2005, the configuration information creating program 211 creates a PDF file which directly uses the PDF file 402 of the print information 401. In the example shown in FIG. 20B, the configuration information creating program 211 creates a PDF file 2006 using the PDF file 1712. Both PDF files have the same content.

In step S2003, the configuration information creating program 211 creates a JDF file, which refers to the PDF file created in step S2002, from the JDF file 404 of the print information 401. Since the PDF file is not structured, a print setting using a hierarchical structure or metadata cannot be used. Thus, a print setting is converted into a print setting referencing the page number(s) of a PDF file.

In the JDF file 1725, a print setting "color printing for page(s) under PDFVT¥Customer¥Letter¥Cover Letter using A4 coated paper" has been made. Thus, as described above, the page 1713 and the page 1715 are printed in color using A4 coated paper. In the example shown in FIG. 20B, the page numbers 1 and 5 respectively corresponding to the page 1713 and the gage 1715 are used, and thus, the print setting is converted into a print setting "color printing for page 1 and page 5 using A4 coated paper".

In the JDF file 1725, a print setting "monochrome printing for page(s) under PDFVT¥Customer¥Letter¥Brochure using A4 high quality paper" has been made. Thus, as described above, the page 1714 and the page 1716 are printed in monochrome using A4 high quality paper. In the example shown in FIG. 20B, the page numbers 2 to 4 and 6 to 8 corresponding to the page 1714 and the page 1716 are used, and thus, the print setting is converted into a print setting "monochrome printing for pages 2 to 4 and pages 6 to 8 using A4 high, quality paper".

In the JDF file 1725, a print setting "mail inserting and sealing in PDFVT¥Customer units" has been made. Thus, as described, above the pages 1713 and 1714 and the pages 1715 and 1716 are separately mail inserted and sealed. In the example shown in FIG. 20B, the page numbers corresponding to the pages, and thus, the print setting is converted into a print setting "mail insert pages 1 to 4 and pages 5 to 8 and seal".

In the JDF file 1725, a print setting "upon mail inserting and sealing, use a blue envelope if metadata Gender of PDFVT¥Customer is Male or a pink envelope if metadata Gender thereof is Female" has been made. Thus, as described above, a blue envelope is used for the pages 1713 and 1714 and a pink envelope is used for the page 1715 and 1716. In the example shown in FIG. 20B, the page numbers corresponding to the pages, and thus, the print setting is converted into a print setting "use blue envelope for pages 1 to 4 and pink envelope for pages 5 to 8". In step S2004, the configuration information creating program 211 ends processing.

As described above, according to the present invention, a print setting utilizing a hierarchical structure and metadata can be made using configuration information such as a JDF file while holding a file described in the existing page description language such as a PDF file. According to the present invention, a hierarchical structure including a repetition specific to variable printing can be defined.

According to the present invention, both of the existing PDF-compatible printer and a new PDF-compatible printer can perform printing reflecting the print setting using existing PDF files and newly created JDF files. According to the present invention, a printer for variable printing (e.g., a PDF/VT-compatible printer) can perform printing by taking an advantage of PDF/VT using existing PDF files and newly created JDF files.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system, or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present, invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit, of Japanese Patent Application No. 2011-123138 filed on Jun. 1, 2011, which is hereby incorporated by reference herein in its entirety.

What is claimed is:

1. An information processing apparatus comprising:

a rule creation unit configured to create a rule for creating configuration information, wherein the created rule includes a repetition rule corresponding to a repetition element;

a configuration information creating unit configured to create the configuration information for first page description language (PDL) data by applying the created rule to the first PDL data;

a storing unit configured to store the configuration information created by the configuration information creating unit;

a print setting unit configured to create a print setting based on a user's instruction, wherein the created print setting is made using job definition format (JDF);

a printer designation unit configured to designate a printer for printing;

a conversion unit configured to convert the first PDL data into second PDL data based on the configuration information in accordance with a designation of a printer compatible with the second PDL data by the printer designation unit;

a print control unit configured to control printing, for the printer compatible with the second PDL data, with the PDL data converted by the conversion unit; and a creation unit configured to create a print setting file for referencing page numbers of the first PDL data based on the configuration information and the created print setting in accordance with a designation of a printer not compatible with the second PDL data by the printer designation unit, wherein the print control unit controls printing, for the printer not compatible with the second PDL data, with the first PDL data and the created print setting file.

2. The information processing apparatus according to claim 1, wherein the configuration information has a hierarchical structure, and wherein the print setting unit makes the created print setting using the hierarchical structure.

3. The information processing apparatus according to claim 1, further comprising a metadata setting unit configured to set metadata for the configuration information, wherein the storing unit stores the configuration information with the metadata, and wherein the print setting unit makes a print setting using the metadata.

4. The information processing apparatus according to claim 1, wherein the rule creation unit sets a record level to the configuration information.

5. The information processing apparatus according to claim 2, wherein the rule has a starting condition and an ending condition corresponding to the hierarchical structure.

6. The information processing apparatus according to claim 5, wherein the starting condition includes at least any one of paper size change and object designation.

7. The information processing apparatus according to claim 5, wherein the ending condition includes at least any one of page number designation and object designation.

8. The information processing apparatus according to claim 1, further comprising a configuration information editing unit configured to edit the configuration information.

9. The information processing apparatus according to claim 1, wherein the first PDL data is PDF or PDF/X.

10. The information processing apparatus according to claim 1, wherein the second PDL data is PDF/VT.

11. An information processing method comprising:

creating a rule for creating configuration information, wherein the created rule includes a repetition rule corresponding to a repetition element;

creating the configuration information for first page description language (PDL) data by applying the created rule to the first PDL data;

storing the created configuration information;

creating a print setting based on a user's instruction, wherein the created print setting is made using job definition format (JDF);

designating a printer for printing;

converting the first PDL data into second PDL data based on the configuration information in accordance with a designation of a printer compatible with the second PDL data;

controlling printing, for the printer compatible with the second PDL data, with the second PDL data;

creating a print setting file for referencing page numbers of the first PDL data based on the configuration information and the created print setting in accordance with a designation of a printer not compatible with the second PDL data; and controlling printing, for the printer not compatible with the second PDL data, with the first PDL data and the created print setting file.

12. A non-transitory storage medium storing a computer-readable program for causing a computer to execute an information processing method, the information processing method comprising:

creating a rule for creating configuration information, wherein the created rule includes a repetition rule corresponding to a repetition element;

creating the configuration information for first page description language (PDL) data by applying the created rule to the first PDL data;

storing the created configuration information;

creating a print setting based on a user's instruction, wherein the created print setting is made using job definition format (JDF);

designating a printer for printing;

converting the first PDL data into second PDL data based on the configuration information in accordance with a designation of a printer compatible with the second PDL data;

controlling printing, for the printer compatible with the second PDL data, with the second PDL data;

creating a print setting file for referencing page numbers of the first PDL data based on the configuration information and the created print setting in accordance with a designation of a printer not compatible the second PDL data; and controlling printing, for the printer not compatible with the second PDL data, with the first PDL data and the created print setting file.

* * * * *